US009527997B2

(12) United States Patent
Wakita et al.

(10) Patent No.: US 9,527,997 B2
(45) Date of Patent: Dec. 27, 2016

(54) POLYORGANOSILOXANE-CONTAINING GRAFT COPOLYMER, RESIN COMPOSITION, AND MOLDED ARTICLE

(71) Applicant: Mitsubishi Rayon Co., Ltd., Tokyo (JP)

(72) Inventors: Ayaka Wakita, Otake (JP); Yuichiro Fujikawa, Otake (JP); Sohei Ueki, Otake (JP); Shinji Matsuoka, Otaka (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/439,745

(22) PCT Filed: Jun. 28, 2013

(86) PCT No.: PCT/JP2013/067938
§ 371 (c)(1),
(2) Date: Apr. 30, 2015

(87) PCT Pub. No.: WO2013/129709
PCT Pub. Date: Sep. 6, 2013

(65) Prior Publication Data
US 2015/0267048 A1 Sep. 24, 2015

(30) Foreign Application Priority Data

Oct. 31, 2012 (JP) .................................. 2012-240403

(51) Int. Cl.
| | | |
|---|---|---|
| *C08L 51/00* | (2006.01) | |
| *C08L 69/00* | (2006.01) | |
| *C08F 283/12* | (2006.01) | |
| *C08L 51/08* | (2006.01) | |
| *C08G 77/445* | (2006.01) | |
| *C08F 285/00* | (2006.01) | |

(52) U.S. Cl.
CPC ............ *C08L 69/00* (2013.01); *C08F 283/124* (2013.01); *C08G 77/445* (2013.01); *C08L 51/085* (2013.01); *C08F 285/00* (2013.01); *C08L 2201/02* (2013.01); *C08L 2205/03* (2013.01); *C08L 2207/04* (2013.01)

(58) Field of Classification Search
CPC ... C08L 69/00; C08L 2201/02; C08L 2205/03; C08L 2207/04; C08G 77/445
USPC ....................................................... 524/504
See application file for complete search history.

(56) References Cited

U.S. PATENT DOCUMENTS

2005/0038149 A1* 2/2005 Hashimoto ........... C08F 283/12
                                                            524/261
2013/0338311 A1* 12/2013 Wakita ................ C08F 290/068
                                                            524/801

FOREIGN PATENT DOCUMENTS

| EP | 0433906 A2 | 6/1991 |
|---|---|---|
| EP | 0433906 A3 | 6/1991 |
| EP | 1273601 A1 | 1/2003 |
| EP | 1475396 A1 | 11/2004 |
| EP | 2674446 A1 | 12/2013 |
| JP | 2003-012910 A | 1/2003 |
| JP | 2003-089749 A | 3/2003 |
| JP | 2003-113299 A | 4/2003 |
| JP | 2003113299 A * | 4/2003 |
| JP | 2003-238639 A | 8/2003 |
| JP | 2003-238793 A | 8/2003 |
| JP | 2003-246919 A | 9/2003 |
| JP | 2004-331726 A | 11/2004 |
| JP | 2004-346271 A | 12/2004 |
| JP | 2007-512411 A | 5/2007 |
| JP | 2010-047749 A | 3/2010 |
| JP | 2010-083987 A | 4/2010 |
| JP | 2010-248275 A | 11/2010 |
| JP | 2011-063706 A | 3/2011 |
| JP | 2012-046562 A | 3/2012 |
| WO | 2005/056682 A1 | 6/2005 |
| WO | 2012/108485 A1 | 8/2012 |

OTHER PUBLICATIONS

Translation of JP 2003-113299, Apr. 18, 2003.*
European Search Report issued in counterpart European Patent Application No. 13755215.4 dated Oct. 6, 2015.
International Search Report issued in corresponding International Patent Application No. PCT/JP2013/067938 dated Sep. 24, 2013.

* cited by examiner

*Primary Examiner* — Hui Chin
(74) *Attorney, Agent, or Firm* — Morgan, Lewis & Bockius LLP

(57) ABSTRACT

A graft copolymer capable of providing impact resistance, flame retardance, and color rendering properties to a thermoplastic resin is described. The graft copolymer contains a polyorganosiloxane, and is obtained by graft-polymerizing vinyl monomers including a (meth)acrylate ester ($b_1$) having an alkyl group or an aromatic group and an aromatic vinyl monomer ($b_2$) on a polyorganosiloxane-based rubber. The graft copolymer has a volume average particle diameter of 200-2000 nm, and contains 0.1-69 mass % of polyorganosiloxane. A thermoplastic resin composition is also described, containing a thermoplastic resin (A), the graft copolymer, a fluorine resin (C) and a flame retardant (D). A molded article is also described, which is obtained by molding the thermoplastic resin composition.

9 Claims, No Drawings

POLYORGANOSILOXANE-CONTAINING GRAFT COPOLYMER, RESIN COMPOSITION, AND MOLDED ARTICLE

FIELD OF THE INVENTION

The invention relates to a polyorganosiloxane-containing graft copolymer improving the impact resistance of a thermoplastic resin and exhibiting high color rendering properties and flame retardance in a molded product obtained from the thermoplastic resin. Moreover, the invention relates to a powder containing the polyorganosiloxane-containing graft copolymer for a thermoplastic resin composition, wherein the thermoplastic resin composition inhibits outgas generated from thermal decomposition of the thermoplastic resin, and has both thermal decomposition resistance and pigment coloring properties.

DESCRIPTION OF RELATED ART

As a generally used engineering plastic, the aromatic polycarbonate resin has superior transparency, impact resistance, heat resistance, and dimensional stability, etc., and, due to such superior characteristics, is widely used in industry as, for instance, a material in the automotive field, the office automation (OA) machine field such as a printer, and the electronics and electric field such as a mobile phone.

The materials have been recently formed into thinner walls every year particularly for the objects of, for instance, miniaturization, weight reduction, and high functionality. Hence, a resin material having sufficient mechanical characteristics such as impact resistance even in a thin-walled and lightweight molded article and exhibiting superior flame retardance, heat resistance, and color rendering properties is desired.

For instance, Patent Document 1 provides a graft copolymer obtained by polymerizing 10 to 60 mass % of a vinyl monomer containing a (meth)acrylate monomer having an aryl group or a benzyl group in the presence of 40 to 90 mass % of a polyorganosiloxane-based rubber.

Moreover, Patent Document 2 provides a composite rubber-based graft copolymer formed by grafting vinyl-based monomers containing 80 mass % or more of an aromatic alkenyl compound on a composite rubber containing polyorganosiloxane and polyalkyl(meth)acrylate.

Patent Document 3 provides a silicone/acrylic composite rubber-based graft copolymer, which is a silicone/acrylic composite rubber-based graft copolymer formed by graft polymerizing one or more vinyl-based monomers on a composite rubber containing polyorganosiloxane rubber and polyalkyl(meth)acrylate rubber. The arithmetic average particle diameter thereof is 300 to 2000 nm, and the proportion of particles less than 300 nm among all particles is 20 vol % or less.

Moreover, Patent Document 4 provides a silicone/acrylic acid composite rubber-based graft copolymer formed by graft polymerizing one or more vinyl-based monomers on a composite rubber containing polyorganosiloxane rubber and polyalkyl(meth)acrylate rubber. The content of the polyorganosiloxane is 15 to 70 mass %, the content of the composite rubber is 75 to 90 mass %, and the load amount of iron in the graft copolymer latex is 0.0001 to 2 ppm.

PRIOR-ART DOCUMENTS

Patent Documents

Patent Document 1: JP 2011-63706 A
Patent Document 2: JP 2003-113299 A
Patent Document 3: JP 2004-331726 A
Patent Document 4: JP 2004-346271 A

SUMMARY OF THE INVENTION

Technical Problem

However, in the method of Patent Document 1, although the flame retardance of the obtained molded article is good, the color rendering properties are unsatisfactory. Moreover, in the method of Patent Document 2, although the color rendering properties of the obtained molded article are good, impact resistance and flame retardance are unsatisfactory.

Patent Document 3 does not mention generation of outgas during high-temperature molding, or chemical resistance. The particle diameter of the graft copolymer of Patent Document 4 is small, and therefore the pigment coloring properties thereof are insufficient.

An object of the invention is to provide a graft copolymer capable of providing thermoplastic resin impact resistance, flame retardance, and color rendering properties (hereinafter "first issue").

Moreover, an object of the invention is to provide a resin composition inhibiting outgas generated due to thermal decomposition of a thermoplastic resin and having thermal decomposition resistance and pigment coloring properties (hereinafter "second issue").

The first issue can be addressed with a first invention group including the items below.

Item 1 is a polyorganosiloxane-containing graft copolymer, which is a polyorganosiloxane-containing graft copolymer (G1) formed by graft polymerizing a vinyl monomer mixture containing a (meth)acrylate ester ($b_1$) having an alkyl group or an aromatic group and an aromatic vinyl monomer ($b_2$) on a polyorganosiloxane-based rubber, wherein the volume average particle diameter is 200 to 2000 nm, and the content of the polyorganosiloxane is 0.1 to 69 mass %.

Item 2 is the polyorganosiloxane-containing graft copolymer of Item 1 in which the vinyl monomer mixture contains 2 to 95 mass % of the aromatic vinyl monomer (b2).

Item 3 is the polyorganosiloxane-containing graft copolymer of Item 1 or 2 in which the polyorganosiloxane-based rubber is a composite rubber containing polyorganosiloxane and polyalkyl(meth)acrylate (PA).

Item 4 is the polyorganosiloxane-containing graft copolymer of any one of Items 1 to 3 in which the content of the polyorganosiloxane is 25 mass % to 40 mass %.

Item 5 is the polyorganosiloxane-containing graft copolymer of any one of Items 1 to 4 in which the content of the polyorganosiloxane-based rubber is 80 mass % to 95 mass %.

Item 6 is the polyorganosiloxane-containing graft copolymer of any one of Items 1 to 5 in which the volume average particle diameter is 350 nm to 750 nm.

Item 7 is the polyorganosiloxane-containing graft copolymer of any one of Items 1 to 6 in which the volume average particle diameter is 400 nm to 700 nm.

Item 8 is the polyorganosiloxane-containing graft copolymer of any one of Items 1 to 7 in which the volume average particle diameter is 480 nm to 700 nm.

Item 9 is the polyorganosiloxane-containing graft copolymer of Item 1 in which regarding a test piece produced under the following production condition 1, the Charpy impact strength ($kJ/m^2$), the total light transmittance (%), and flame retardance measured under the evaluation condition 2 below meet the following performance conditions 1) to 3):

1) 15≤Charpy impact strength≤70,
2) 60≤Charpy impact strength+total light transmittance× 1.36, and
3) the flame retardance of a thickness of 1/16 inch in a vertical flame test of UL94 standard being "V-1" or above, wherein the production condition 1 for the test piece comprises:
providing a resin composition containing materials 1) to 4) below:
1) an aromatic polycarbonate resin having a viscosity average molecular weight of 22,000 (Iupilon S-2000F made by Mitsubishi Engineering-Plastics Corporation) in 100 mass parts,
2) a polyorganosiloxane-containing graft copolymer (G1) in 5.5 mass parts,
3) an acrylic acid-modified polytetrafluoroethylene (Metablen A-3800 made by Mitsubishi Rayon Co., Ltd.) in 0.5 mass part, and
4) an aromatic phosphate-based flame retardant (PX-200 made by Daihachi Chemical Industry Co., Ltd.) in 5.5 mass parts,
to a devolatilizing extruder (PCM-30 made by Ikegai Corp) heated to a barrel temperature of 280° C.,
performing kneading under a condition of a screw speed of 150 rpm to obtain particles,
providing the particles to a 100 ton injection molding machine (SE-100DU made by Sumitomo Heavy Industries, Ltd.), and
performing molding under the conditions of a material cylinder temperature of 280° C. and a mold temperature of 90° C. to obtain the following test pieces:
i) a test piece 1 (length: 80.0 mm, width: 10.0 mm, thickness: 4 mm, provided with a V-shaped notch) provided with a Charpy notch for the impact strength evaluation,
ii) a test piece 2 (length: 100 mm, width: 50 mm, thickness: 2 mm) for the total light transmittance evaluation, and
iii) a test piece 3 (length: 127 mm, width: 12.7 mm, thickness: 1.6 mm) having a thickness of 1/16 inch for the flame retardance evaluation;
and the evaluation condition 2 comprises:
measuring the Charpy impact strength ($kJ/m^2$) of the test piece 1 according to JIS K 7111-1/1eA at a temperature of −30° C.,
measuring the total light transmittance (%) of the test piece 2 to a D65 light source using a hazemeter NDH4000 made by Nippon Denshoku Industries Co., Ltd. based on JIS K 7375, and
measuring, for the flame retardance, a total burn time of five test pieces 3 according to a vertical flame test method of a UL94V test.

Item 10 is a thermoplastic resin composition containing a thermoplastic resin (A), the polyorganosiloxane-containing graft copolymer (G1) of any one of Items 1 to 9, a fluorine resin (C), and a flame retardant (D).

Item 11 is the thermoplastic resin composition of Item 10 in which the thermoplastic resin (A) is a thermoplastic resin having at least one bond selected from a carbonate bond, an ester bond, and an amide bond.

Item 12 is the thermoplastic resin composition of Item 11 in which the thermoplastic resin (A) is a polycarbonate-based resin.

Item 13 is the thermoplastic resin composition of any one of Items 10 to 12 in which the flame retardant (D) contains at least one flame retardant selected from a phosphorus-based flame retardant and an organic metal salt-based flame retardant.

Item 14 is a molded article obtained by molding the thermoplastic resin composition of any one of Items 10 to 13.

The second issue can be addressed by a second invention group including the items below.

Item 21 is a powder being a powder of the polyorganosiloxane-containing graft copolymer (G2) obtained by graft polymerizing one or more vinyl monomers on a polyorganosiloxane-based rubber, wherein the particle diameter of the polyorganosiloxane-containing graft copolymer (G2) measured via absorptiometry is 300 nm to 2000 nm, the alkali metal content of the powder is 0 to 20 ppm, and the alkaline earth metal content of the powder is 0 to 150 ppm.

Item 22 is the powder of Item 21 in which the sulfur content of the powder is 0 to 200 ppm.

Item 23 is the powder of Item 21 or 22 in which the polyorganosiloxane-based rubber is a composite rubber containing polyorganosiloxane and polyalkyl(meth)acrylate (PA).

Item 24 is the powder of any one of Items 21 to 23 in which the vinyl monomers form a monomer mixture containing an aromatic vinyl monomer.

Item 25 is the powder of any one of Items 21 to 24 in which the sp value of the graft portion of the polyorganosiloxane-containing graft copolymer (G2) calculated via the Fedors method is 20.15 to 21.00.

Item 26 is the powder of any one of Items 21 to 25 in which the vinyl monomers form a monomer mixture containing a crosslinking monomer.

Item 27 is a powder being a powder of the polyorganosiloxane-containing graft copolymer (G2) obtained by graft polymerizing vinyl monomers on a polyorganosiloxane-based rubber, wherein the vinyl monomers form a monomer mixture containing an aromatic vinyl monomer, the alkali metal content of the powder is 0 ppm to 20 ppm, and the alkaline earth metal content of the powder is 0 ppm to 150 ppm.

Item 28 is the powder of Item 27 in which the sulfur content of the powder is 0 to 200 ppm.

Item 29 is the powder of any one of Items 21 to 28 in which regarding a resin composition used in production condition 11 below, the number of generated silver streaks measured under evaluation condition 12 below is 0,
wherein
the production condition 11 of the resin composition and a test piece comprises:
preparing and providing the materials 1) to 5) below:
1) the powder of the polyorganosiloxane-containing graft copolymer (G2) in 4 mass parts,
2) an aromatic polycarbonate resin having a viscosity average molecular weight of 22,000 (Iupilon S-2000F made by Mitsubishi Engineering-Plastics Corporation) in 96 mass parts,
3) Irganox1076 (made by BASF Corporation) in 0.1 mass part,
4) Adekastab 2112 (made by Adeka Corporation) in 0.1 mass part, and
5) carbon black #960 (made by Mitsubishi Chemical Corporation) in 0.1 mass part, to a devolatilizing extruder (PCM-30 made by Ikegai Corp) heated to a barrel temperature of 280° C.,
kneading the materials under a condition of a screw speed of 150 rpm to obtain particles of the resin composition, using a 100 ton injection molding machine (SE-100DU made by Sumitomo Heavy Industries, Ltd.) and a mold having a hot runner (test piece dimension: longitude: 100 mm×transverse: 100 mm×thickness: 2 mm, pin gate) to perform molding on the particles under the conditions of a material cylinder temperature of 310° C., a hot runner temperature of 310° C., and a mold temperature of 90° C. to produce an injection molded article of a first shot, and after the first-shot molding of the injection molding machine and after the resin composition is kept in the injection molding machine for 6 min, performing another shot of molding to obtain a test piece 11;

and the evaluation condition 12 comprises:

visually confirming the number of silver streaks generated near the gate of the test piece 11.

Item 30 is the powder of any one of Items 21 to 29 in which regarding the resin composition used in the production condition 11, a L* value measured under evaluation condition 13 below is 20 or less, wherein the evaluation condition 13 comprises:

in a 100 ton injection molding machine (SE-100DU made by Sumitomo Heavy Industries, Ltd.), molding the particles of the resin composition under the conditions of a material cylinder temperature of 310° C. and a mold temperature of 90° C. to obtain a test piece 13 (length: 100 mm, width: 50 mm, thickness: 2 mm), with JIS Z 8729 (a representation method of an object color of an L*a*b* color system), measuring the object color of the test piece 13 based on JISZ8722 using a spectroscopic colorimeter SE-2000 made by Nippon Denshoku Industries Co., Ltd. under the conditions of an apparatus of a spectroscopic colorimeter SE-2000 (made by Nippon Denshoku Industries Co., Ltd., with after-sample light splitting of 0°-45°), a measurement range of 380 nm to 780 nm, and a measurement light source of C light (2° field of view), wherein the L* value is calculated according to tristimulus values (XYZ) using a CIE color difference formula.

Item 31 is a resin composition containing the powder and the resin of any one of Items 21 to 30.

Item 32 is the resin composition of Item 31 in which in 100 mass % of the resin composition, the content of the powder of the polyorganosiloxane-containing graft copolymer (G2) is 0.5 mass % to 90 mass %.

Item 33 is the resin composition of Item 31 or 32 in which the resin is a thermoplastic resin.

Item 34 is the resin composition of Item 33 in which the thermoplastic resin is an aromatic polycarbonate resin.

Item 35 is a molded article obtained by molding the resin composition of any one of Items 31 to 34.

Effects of the Invention

By mixing the graft copolymer of the first invention group in a thermoplastic resin, a resin composition having high impact resistance can be obtained without compromising the color rendering properties and the flame retardance of the thermoplastic resin.

By mixing the powder of the second invention group in a thermoplastic resin, outgas generated from thermal decomposition of the thermoplastic resin can be inhibited, so that a resin composition having superior thermal decomposition resistance is obtained. Moreover, a resin composition having pigment coloring properties can also be obtained.

DESCRIPTION OF THE EMBODIMENTS

In the invention, "(meth)acrylate" represents at least one of "acrylate" and "methacrylate," and "(co)polymer" represents at least one of "polymer" and "copolymer".

The invention is described in detail below. The entirety of the descriptions regarding the materials, the production conditions and so on applies to both the first invention group and the second invention group unless otherwise stated.

<Polyorganosiloxane-Containing Graft Copolymer>

The polyorganosiloxane-containing graft copolymer (G1) (often called "graft copolymer (G1)" or "copolymer (G1)" hereinafter) of the first invention group is a copolymer formed by graft polymerizing a vinyl monomer mixture containing a (meth)acrylate ester ($b_1$) having an alkyl or an aromatic group and an aromatic vinyl monomer ($b_2$) on a polyorganosiloxane-based rubber.

The polyorganosiloxane-containing graft copolymer (G2) (often called "graft polymer (G2)" or "copolymer (G2)" hereinafter) of the second invention group is a copolymer obtained by graft polymerizing one or more vinyl monomers on a polyorganosiloxane-based rubber.

The powder of the polyorganosiloxane-containing graft copolymer (G2) of the second invention group is the powder of the graft copolymer (G2), which is collected from a latex of the graft copolymer with a method such as a spray drying method or a coagulation method.

[Polyorganosiloxane-Based Rubber]

The polyorganosiloxane-based rubber is preferably a polyorganosiloxane rubber or a composite rubber containing a polyorganosiloxane and a polyalkyl(meth)acrylate.

[Polyorganosiloxane Rubber]

Polyorganosiloxane is a polymer containing an organosiloxane unit as a structural unit. The polyorganosiloxane rubber can be obtained by polymerizing an organosiloxane or an organosiloxane mixture also containing an optional component. Examples of the optional component include a siloxane-based crosslinking agent, a siloxane-based graft-linking agent, and a siloxane oligomer having a terminal capping group, etc.

The organosiloxane can adopt either of chain organosiloxane and cyclic organosiloxane. The polymerization stability of the cyclic organosiloxane is high and its polymerization rate is fast, which is preferred. The cyclic organosiloxane is preferably a cyclic organosiloxane having 3 to 7 rings, such as hexamethylcyclotrisiloxane, octamethylcyclotetrasiloxane, decamethyl-cyclopentasiloxane, dodecamethylcyclohexasiloxane, trimethyltriphenylcyclotrisiloxane, tetramethyltetraphenylcyclotetrasiloxane, octaphenylcyclotetrasiloxane, etc. The compounds can be used alone, or in combination of two or more. Among the compounds, from the perspective of readily controlling particle diameter distribution of the polyorganosiloxane-based rubber, the amount of octamethylcyclotetrasiloxane is preferably 60 mass % or more.

The siloxane-based crosslinking agent preferably has a siloxane group. By using a siloxane-based crosslinking agent, a polyorganosiloxane having a crosslinked structure can be obtained. Examples of the siloxane-based crosslinking agent include tri- and tetra-functional crosslinking agents such as trimethoxymethylsilane, triethoxyphenylsilane, tetramethoxysilane, tetraethoxysilane, tetra-n-propoxysilane, and tetrabutoxysilane. In particular, a tetrafunctional cross-linking agent is preferred, and tetraethoxysilane is more preferred. The content of the siloxane-based crosslinking agent is preferably 0.1 mass % to 30 mass % in 100 mass % of the organosiloxane mixture.

The siloxane-based graft-linking agent has a siloxane group and has a functional group capable of being copolymerized with a vinyl monomer. By using the siloxane-based graft-linking agent, a polyorganosiloxane having a functional group capable of being copolymerized with a vinyl monomer can be obtained. By using such a graft-linking agent, the alkyl(meth)acrylate component or the vinyl monomer for the composite rubber described later can be grafted on the polyorganosiloxane through radical polymerization.

The siloxane-based graft-linking agent can be exemplified by siloxanes of formula (1).

$$RSiR^1_n(OR^2)_{3-n} \quad (1)$$

In formula (1), $R^1$ represents methyl, ethyl, propyl or phenyl. $R^2$ represents an organic group in the alkoxy group, sucg as methyl, ethyl, propyl, or phenyl, etc., n represents 0, 1 or 2, and R represents any group represented by any one of formulas (2) to (5).

$$CH_2=C(R^3)-COO-(CH_2)_p- \quad (2)$$

$$CH_2=C(R^4)-C_6H_4- \quad (3)$$

$$CH_2=CH- \quad (4)$$

$$HS-(CH_2)_p- \quad (5)$$

In these formulas, $R^3$ and $R^4$ each represent hydrogen or methyl, and p represents an integer of 1 to 6.

The functional group of formula (2) can be exemplified as a methacryloyloxy alkyl group. Example of the siloxane having the group include β-methylacryloxyethyl dimethoxy methyl silane, γ-methylacryloxypropyl methoxy dimethyl silane, γ-methylacryloxypropyl dimethoxy methyl silane, γ-methylacryloxypropyl trimethoxy silane, γ-methylacryloxypropyl ethoxy diethyl silane, γ-methylacryloxypropyl diethoxy methyl silane, and δ-methylacryloxybutyl diethoxy methyl silane, etc.

The functional group of formula (3) can be exemplified by a vinylphenyl group. The siloxane having the group can be exemplified by vinylphenyl ethyl dimethoxy silane.

The siloxane having the functional group of formula (4) can be exemplified by vinyl trimethoxy silane and vinyl triethoxy silane.

The functional group of formula (5) can be exemplified by a mercaptoalkyl group. Examples of the siloxane having the group include γ-mercaptopropyl dimethoxy methyl silane, γ-mercaptopropyl methoxy dimethyl silane, γ-mercaptopropyl diethoxy methyl silane, γ-mercaptopropyl ethoxy dimethyl silane, and γ-mercaptopropyl trimethoxy silane, etc.

The siloxane-based graft-linking agents can be used alone, or in combination of two or more. The content of the siloxane-based graft-linking agent is preferably 0.05 mass % to 20 mass % in 100 mass % of the organosiloxane mixture.

The so-called siloxane oligomer having a terminal capping group refers to a siloxane oligomer having, for instance, an alkyl group at the terminal of an organosiloxane oligomer to stop the polymerization of the polyorganosiloxane.

Examples of the siloxane oligomer having a terminal capping group include hexamethyldisiloxane, 1,3-bis(3-glycidoxypropyl)tetramethyldisiloxane, 1,3-bis(3-aminopropyl)tetramethyldisiloxane, and methoxy trimethyl silane.

[Method for Producing Polyorganosiloxane Rubber]

The method for producing the polyorganosiloxane rubber is not particularly limited, and can be the following production method, for example.

First, after an emulsion is prepared by emulsifying an organosiloxane or the organosiloxane mixture using an emulsifier and water, polymerization is performed under a high temperature using an acidic catalyst. Then, neutralization is performed via an alkaline substance to obtain a latex of a polyorganosiloxane rubber. Moreover, in the following description of the production method, the case where the "organosiloxane mixture" is used as the raw material of the latex is described, and the case where the "organosiloxane" is used can also adopt the same process.

In the production method, the method for preparing the emulsion can be exemplified by a method in which a homomixer is used to do microparticulation by a high-speed rotational shear force, or a method where, for example, a homogenizer is used to do microparticulation by the ejection force of a high-pressure generation machine so as to perform mixing by high-speed stirring, etc. Among these methods, the method using a homogenizer is preferred since the particle diameter distribution of the latex of the polyorganosiloxane rubber is narrow.

Examples of the method for mixing the acid catalyst during the polymerization include: 1) a method where the organosiloxane mixture, the emulsifier and water are mixed, 2) a method where an aqueous acid catalyst solution is added in the emulsion of the organosiloxane mixture, and 3) a method where the emulsion of the organosiloxane mixture is added dropwise in a high-temperature aqueous acid solution at a certain speed for mixing, etc. From the perspective of readily controlling the particle diameter of the polyorganosiloxane, a method where the emulsion of the organosiloxane mixture is kept under a high temperature and then an aqueous acid catalyst solution is added is preferred.

The polymerization temperature is preferably 50° C. or more, more preferably 70° C. or more. Moreover, in a case that an aqueous acid catalyst solution is added in the emulsion of the organosiloxane mixture to perform polymerization, the polymerization time is usually 2 hours or more, preferably 5 hours or more.

Moreover, since a crosslinking reaction occurred between silanols under a temperature of 30° C. or less to increase the crosslinking density of the polyorganosiloxane, it is also possible that after the polymerization is performed under a high temperature of 50° C. or more, the formed latex is maintained under a temperature of 30° C. or less for about 5 hours to about 100 hours.

The polymerization reaction of the organosiloxane mixture can be terminated by neutralizing the latex to pH 6 to 8 using an alkaline substance such as sodium hydroxide, potassium hydroxide, or aqueous ammonia solution.

In the production method, the emulsifier is not particularly limited as long as the used emulsifier can emulsify the organosiloxane mixture, but is preferably an anionic emulsifier or a nonionic emulsifier. Examples of the anionic emulsifier include sodium alkylbenzenesulfonate, sodium alkyldiphenyletherdisulfonate, sodium alkylsulfate, sodium polyoxyethylenealkylsulfate, and sodium polyoxyethylenenonylphenylethersulfate.

Examples of the nonionic emulsifier include polyoxyethylene alkyl ether, polyoxyethylene alkylene alkyl ether, polyoxyethylene distyrenated phenyl ether, polyoxyethylene tribenzylphenyl ether, and polyoxyethylene polyoxypropylene glycol, etc.

The emulsifiers can be used alone, or in combination of two or more.

Relative to 100 mass parts of the organic siloxane mixture, the amount of the used emulsifier is preferably 0.05 to 10 mass parts, more preferably 0.1 to 5 mass parts. By changing the amount of the used emulsifier, the particle diameter of the latex of the polyorganosiloxane rubber can be adjusted to the desired value. When the amount of the used emulsifier is 0.05 mass parts or above, the emulsion stability of the emulsion of the organosiloxane emulsion mixture is sufficient. When the amount of the used emulsifier is 10 mass parts or less, coloring of the powder containing the graft copolymer caused by the emulsifier can be inhibited, and reduction in thermal decomposition resistance of the resin composition containing the graft copolymer and the resin can be inhibited.

Examples of the acid catalyst used in the polymerization of the organosiloxane mixture include: sulfonic acids, such as aliphatic sulfonic acid, aliphatic-substituted benzenesulfonic acid, and aliphatic-substituted naphthalenesulfonic acid, etc.; and inorganic acids, such as sulfuric acid, hydrochloric acid, and nitric acid, etc. The acid catalysts can be used alone, or in combination of two or more. Among them, if an inorganic acid such as sulfuric acid, hydrochloric acid or nitric acid is used, the particle diameter distribution of the latex of the polyorganosiloxane rubber can be made narrow. Moreover, poor appearance of the molded product caused by the emulsifier component in the latex of the polyorganosiloxane rubber can be inhibited.

The mass average particle diameter of the latex of the polyorganosiloxane rubber for the first invention group is preferably 150 to 1000 nm. When the mass average particle diameter is 150 nm to 1000 nm, the volume average particle diameter of the graft copolymer (G1) obtained from the polyorganosiloxane rubber can be adjusted to 200 nm to 2000 nm.

The mass average particle diameter of the latex of the polyorganosiloxane rubber for the second invention group is preferably 250 to 1000 nm. When the mass average particle diameter is 250 to 1000 nm, the particle diameter of the graft copolymer obtained from the polyorganosiloxane rubber measured by absorptiometry can be adjusted to 300 nm to 2000 nm.

The ratio of the mass average particle diameter (Dw) to the number average particle diameter (Dn) of the latex of the polyorganosiloxane rubber is preferably 1.0 to 1.7. When the Dw/Dn ratio is 1.0 to 1.7, a graft copolymer having high pigment color rendering properties can be obtained.

Dw and Dn can adopt values measured via the following method.

A product formed by diluting the latex of the polyorganosiloxane rubber to a concentration of about 3% by deionized water is used as the sample, and the particle diameter is measured by a CHDF2000-type particle size distribution meter made by Matec Instrument Companies, Inc.

The measurement can be performed under the following standard conditions recommended by Matec Instrument Companies, Inc.:
cartridge: dedicated capillary-type cartridge for particle separation (trade name: C-202),
carrier fluid: dedicated carrier fluid (trade name: 2XGR500),
liquidity of carrier fluid: substantially neutral,
flow rate of carrier fluid: 1.4 ml/min,
pressure of carrier fluid: about 4,000 psi (2,600 kPa),
measured temperature: 35° C., and
sample usage amount: 0.1 ml.

Moreover, the standard particle matter adopts monodispersed polystyrene made by Duke for which the particle diameter is known, and 12 kinds of particles of which the particle diameter are within the range of 40 nm to 800 nm are used.

In the latex of the polyorganosiloxane rubber obtained with the above method, in order to increase the mechanical stability, an emulsifier can also be added as needed. The emulsifier is preferably the same anionic emulsifier or nonionic emulsifier exemplified above.

[Composite Rubber]

In the invention, the polyorganosiloxane-based rubber can adopt a composite rubber that contains a polyorganosiloxane and a polyalkyl(meth)acrylate (hereinafter "composite rubber"). The composite rubber is a rubber containing the above polyorganosiloxane and a polyalkyl(meth)acrylate of which the homopolymer has a glass transition temperature Tg of 0° C. or less, and is preferably a rubber obtained by polymerizing an alkyl(meth)acrylate in the presence of the polyorganosiloxane rubber.

The polyalkyl(meth)acrylate (PA) constituting the composite rubber can be obtained by polymerizing an alkyl (meth)acrylate component (hereinafter "(meth)acrylate component for composite rubber"). The (meth)acrylate component for composite rubber preferably contains an alkyl (meth)acrylate and a crosslinking monomer for which the glass transition temperature Tg represented by the following Fox equation is between 0° C. and −100° C.

$$1/(273+Tg) = \Sigma(w_i/(273+Tg_i))$$ Equation (1)

Tg: glass transition temperature (° C.) of copolymer,
$w_i$: mass fraction of a monomer i,
$Tg_i$: glass transition temperature (° C.) of the homopolymer of the i-th monomer.

Moreover, the value of $Tg_i$ may adopt the value recited in the Polymer Handbook, vol. 1 (Wiley-Interscience).

Examples of the (meth)acrylate component for the composite rubber include methyl (meth)acrylate, ethyl(meth) acrylate, n-propyl(meth)acrylate, isopropyl(meth)acrylate, n-butyl (meth)acrylate, isobutyl(meth)acrylate, t-butyl (meth)acrylate, and 2-ethylhexyl(meth)acrylate. The compounds can be used alone, or in combination of two or more.

To make the glass transition temperature of polyalkyl (meth)acrylate (PA) between 0° C. and −100° C., an alkyl (meth)acrylate of which the homopolymer has a glass transition temperature between 0° C. and −100° C. is preferably used in an amount of 50 mass % or more, preferably 80 mass % or more. In particular, the mass % is a value based on the total amount of 100 mass % of the (meth)acrylate component for composite rubber for polymerization.

Examples of the alkyl(meth)acrylate of which the homopolymer has a Tg of 0° C. or less include ethyl acrylate, n-propyl acrylate, n-butyl acrylate, isobutyl acrylate, and 2-ethylhexyl acrylate, etc. The compounds can be used alone, or in combination of two or more. In consideration of the impact resistance of the thermoplastic resin composition and the luster of the molded product, n-butyl acrylate is preferred among the compounds.

Examples of the crosslinking monomer include the following polyfunctional monomers: allyl methacrylate, triallyl cyanurate, triallyl isocyanurate, divinylbenzene, ethylene glycol dimethacrylate, propylene glycol dimethacrylate, 1,3-butanediol dimethacrylate, 1,4-butanediol dimethacrylate, 1,6-hexanediol diacrylate, and triallyl trimellitate, etc. The compounds can be used alone, or in combination of two or more.

In the production of the composite rubber for the first invention group, the amount of the used crosslinking monomer in 100 mass % of the polyalkyl(meth)acrylate component is preferably 0.1 to 20.0 mass %, and more preferably 0.3 to 10.0 mass %. When the amount of the used crosslinking monomer is 0.1 to 20.0 mass %, a molded article having superior impact strength can be obtained.

In the production of the composite rubber for the second invention group, the amount of the used crosslinking monomer in 100 mass % of the polyalkyl(meth)acrylate component is preferably 0.1 to 2.0 mass %, more preferably 0.3 to 1.8 mass %. When the amount of the used crosslinking monomer is 0.1 to 2.0 mass %, a molded article having superior impact strength can be obtained.

The content of the polyorganosiloxane in 100 mass % of the composite rubber is preferably 5 to 65 mass %, and more preferably 10 to 40 mass %. When the content is 5 mass % or more, a resin composition having superior impact strength and chemical resistance under low temperature can be obtained. When the content of the polyorganosiloxane is 65 mass % or less, a resin composition having superior pigment coloring properties can be obtained.

[Method for Producing Composite Rubber]

The method for producing the composite rubber is not particularly limited, and can be, e.g., an emulsion polymerization method, a suspension polymerization method, or a microsuspension polymerization method, wherein an emulsion polymerization method is preferred. In particular, a method in which emulsion polymerization is performed on the (meth)acrylate component for composite rubber in the presence of the latex of the polyorganosiloxane rubber to obtain a latex of the composite rubber is more preferred.

The method for preparing the mixture of the latex of the polyorganosiloxane rubber and the (meth)acrylate component for the composite rubber can be exemplified by a method in which the alkyl(meth)acrylate and the crosslinking monomer are added in the latex of the polyorganosiloxane rubber. The (meth)acrylate component for the composite rubber is thus impregnated in the particles of the polyorganosiloxane rubber, and then a known radical polymerization initiator is used to perform polymerization. In the production method, examples of the method of adding the (meth)acrylate component for the composite rubber in the latex of the polyorganosiloxane rubber include: a method of adding a total amount thereof, and a method of dropwise addition at a certain speed.

In producing the latex of the composite rubber, for stabilizing the latex and controlling the particle diameter of the composite rubber, an emulsifier can be added. The emulsifier is not particularly limited, and an anionic emulsifier and a nonionic emulsifier are preferred.

Examples of the anionic emulsifier include sodium alkylbenzenesulfonate, sodium alkyldiphenyletherdisulfonate, sodium alkylsulfate, sodium polyoxyethylenealkylsulfate, alkyl polyoxyethylenenonylphenylethersulfate, sodium sarcosinate, potassium salt of a fatty acid, sodium salt of a fatty acid, dipotassium alkenylsuccinate, rosin acid soap, sodium polyoxyethylenealkylphosphate, and calcium polyoxyethylenealkylphosphate, etc.

Examples of the nonionic emulsifier include polyoxyethylene alkyl ether, polyoxyethylene distyrenated phenyl ether, and polyoxyethylene tribenzylphenyl ether, etc. The emulsifiers can be used alone, or in combination of two or more.

Examples of the radical polymerization initiator used to polymerize the (meth)acrylate component for the composite rubber include an azo-based initiator, peroxide, and a redox-based initiator as a combination of a peroxide and a reducing agent, etc. The compounds can be used alone, or in combination of two or more. From the perspective of inhibiting outgas of the resin composition (in particular an aromatic polycarbonate resin composition), an azo-based initiator or a redox-based initiator is preferred.

Examples of the azo-based initiator include: oil-soluble azo-based initiators, such as 2,2'-azobisisobutyronitrile and dimethyl 2,2'-azobis(2-methyl propionate), etc.; and water-soluble azo-based initiators, such as 4,4'-azobis(4-cyanopentanoic acid), 2,2'-azobis[N-(2-carboxymethyl)-2-methylpropionamidine]hydrate, 2,2'-azobis-(N,N'-dimethyleneisobutylamidine) dihydrochloride, and 2,2'-azobis[2-(2-imidazolin-2-yl)propane]dihydrochloride, etc. The compounds can be used alone, or in combination of two or more.

Examples of the peroxide include: inorganic peroxide, such as hydrogen peroxide, potassium persulfate, and ammonium persulfate, etc.; and organic peroxides, such as diisopropylbenzene hydroperoxide, p-menthane hydroperoxide, cumene hydroperoxide, t-butyl hydroperoxide, succinic acid peroxide, t-butyl peroxyneodecanoate, t-butyl peroxyneoheptanoate, t-butyl peroxy trimethylacetate, 1,1,3,3-tetramethylbutyl peroxy-2-ethylhexanoate, and t-butyl peroxy-2-ethylhexanoate, etc. The peroxides can be used alone, or in combination of two or more.

From the perspective of inhibiting outgas of the aromatic polycarbonate resin composition, an organic peroxide is preferred among the peroxides. Among them, from the perspective of chemical resistance, diisopropylbenzene hydroperoxide, p-menthane hydroperoxide, or cumene hydroperoxide is more preferred.

In a case that the redox-based initiator is formed by the combination of a peroxide and a reducing agent, the above peroxide and a reducing agent such as sodium formaldehydesulfoxylate, L-ascorbic acid, fructose, dextrose, sorbose or inositol are preferably combined with ferrous sulfateethylenediaminetetraacetic acid disodium salt for use.

The reducing agents can be used alone, or in combination of two or more. Moreover, in the case that sodium formaldehydesulfoxylate is used as the reducing agent, from the perspective of inhibiting outgas of the resin composition, the usage amount is preferably inhibited as much as possible.

In a case that an azo-based initiator is used, the amount of the used radical polymerization initiator is preferably 0.01 to 1 mass part relative to 100 mass parts of the composite rubber.

In a case that a redox-based initiator is used, the amount of the used peroxide is preferably 0.01 to 1 mass part relative to 100 mass parts of the composite rubber. The amount of the used reducing agent is preferably 0.01 to 1 mass part relative to 100 mass parts of the composite rubber.

In the production of the composite rubber for the second invention group, particularly in the case that sodium formaldehydesulfoxylate is used as the reducing agent, from the perspective of making the content of the alkaline earth metal in the powder of the graft copolymer 0 to 150 ppm, 0.01 to 0.2 mass part is more preferred.

[Graft Copolymer (G1)]

The polyorganosiloxane-containing graft copolymer (G1) of the first invention group is a graft copolymer formed by grafting a vinyl monomer mixture containing a (meth)acrylate ester ($b_1$) having an alkyl group or an aromatic group and an aromatic vinyl monomer ($b_2$) on a polyorganosiloxane-based rubber. Graft polymerization can be performed on the vinyl monomer mixture in the presence of the above polyorganosiloxane-based rubber to obtain the graft copolymer (G1). In the following, the (meth)acrylate ester ($b_1$) having an alkyl group or an aromatic group is sometimes referred to as "(meth)acrylate ester ($b_1$)".

The graft component contains a component derived from the (meth)acrylate ester ($b_1$), so the miscibility and the dispersibility of the graft copolymer (G1) in the thermoplastic resin (A) such as a polycarbonate-based resin are superior. Moreover, the graft copolymer (G1) contains a component derived from the aromatic vinyl monomer ($b_2$), so the flame retardance of the resin composition containing the graft copolymer (G1) and the thermoplastic resin (A) is superior.

In the scope of the (meth)acrylate ester ($b_1$) of the invention, examples of the (meth)acrylate having an alkyl group include: alkyl methacrylates, such as methyl methacrylate, ethyl methacrylate, n-butyl methacrylate, and isobutyl methacrylate, etc; and alkyl acrylates, such as methyl acrylate, etc. The monomers can be used alone, or in combination of two or more.

Moreover, the (meth)acrylate having an aromatic group means a (meth)acrylate having an aromatic hydrocarbon group such as phenyl, and examples thereof include phenyl (meth)acrylate, benzyl(meth)acrylate, 4-t-butylphenyl (meth)acrylate, monobromophenyl (meth)acrylate, dibromophenyl(meth)acrylate, 2,4,6-tribromophenyl(meth)acrylate, monochlorophenyl(meth)acrylate, dichlorophenyl (meth)acrylate, trichlorophenyl (meth)acrylate, and naphthalene (meth)acrylate, etc. The monomers can be used alone, or in combination of two or more.

Examples of the aromatic vinyl monomer ($b_2$) of the invention include styrene, α-methylstyrene, p-methylstyrene, p-t-butylstyrene, p-methoxystyrene, o-methoxystyrene, 2,4-dimethoxystyrene, chlorostyrene, bromostyrene, vinyl toluene, vinylnaphthalene, and vinylanthracene, etc. The monomers can be used alone, or in combination of two or more.

The vinyl monomer mixture of the invention may also contain other monomers ($b_3$) capable of copolymerization without compromising the objects of the invention. Examples of such other monomers ($b_3$) include: monomers containing a carboxyl group, such as (meth)acrylic acid and carboxyethyl(meth)acrylate, etc.; cyanized vinyl monomers, such as (meth)acrylonitrile, etc.; vinyl ether monomers, such as vinyl methyl ether and vinyl ethyl ether, etc.; vinyl carboxylate monomers, such as vinyl benzoate, vinyl acetate, and vinyl butyrate, etc.; (meth)acrylates having a reactive functional group, such as glycidyl(meth)acrylate, allyl (meth)acrylate, and 1,3-butylene di(meth)acrylate; olefins, such as ethylene, propylene and butylene, etc; and so on. The monomers can be used alone, or in combination of two or more.

The amount of the used aromatic vinyl monomer ($b_2$) in 100 mass % of the vinyl monomer mixture is preferably 2 to 95 mass %, more preferably 2 to 71 mass %, and still more preferably 10 to 65 mass %. The amount of the used (meth)acrylate ester ($b_1$) in 100 mass % of the vinyl monomer mixture is preferably 5 to 98 mass %, more preferably 29 to 98 mass %, and still more preferably 35 to 90 mass %. The usage amount of the other monomers ($b_3$) in 100 mass % of the vinyl monomer mixture is preferably 5 mass % or less.

In the case that the amount of the used aromatic vinyl monomer ($b_2$) is 2 mass % or more, the flame retardance of the molded article is good, and in the case of 95 mass % or less, the miscibility and the dispersibility of the graft copolymer (G1) in the thermoplastic resin (A) are good. If the miscibility and the dispersibility are poor, the graft copolymer (G1) is observed in the form of a foreign body in the molded article, or the flame retardance of the molded article is degraded, which is unsatisfactory.

In the case that the amount of the used (meth)acrylate ester ($b_1$) in the vinyl monomer mixture is 5 mass % or more, the miscibility and the dispersibility of the graft copolymer (G1) in the thermoplastic resin (A) are good, and in the case of 98 mass % or less, the flame retardance of the molded article is good.

The content of the component derived from the aromatic vinyl monomer ($b_2$) in 100 mass % of the graft copolymer (G1) is preferably 0.1 to 20 mass %, more preferably 1 to 15 mass %, and still more preferably 3 to 10 mass %.

The content of the "polyorganosiloxane" in 100 mass % of the graft copolymer (G1) is 0.1 to 69 mass %, preferably 5 to 60 mass %, more preferably 10 to 40 mass %, still more preferably 15 to 40 mass %, and particularly preferably 25 to 40 mass %. In the case that the content of the polyorganosiloxane is 0.1 mass % or more, the impact strength and the flame retardance of the molded article under low temperature are good, and in the case of 69 mass % or less, the color rendering properties of the molded article are good.

The content of the "polyorganosiloxane-based rubber" in 100 mass % of the graft copolymer (G1) is preferably 10 to 99 mass %. When the content is 10 mass % or more, the impact strength of the molded article under low temperature is sufficient, and when 99 mass % or less, the surface appearance of the resin composition is good, which is preferred. Moreover, in consideration of better chemical resistance of the resin composition, the content is preferably 60 to 97 mass %, more preferably 75 to 95 mass %, and still more preferably 80 to 95 mass %.

The volume average particle diameter of the graft copolymer (G1) is 200 to 2000 nm, preferably 250 to 1000 nm, more preferably 300 to 800 nm, still more preferably 350 to 750 nm, particularly preferably 400 to 700 nm, and most preferably 480 to 700 nm. When the volume average particle diameter of the graft copolymer (G1) is 200 nm or more, the impact resistance (in particular low-temperature impact resistance) and the flame retardance of the molded article obtained by mixing the graft copolymer (G1) in the thermoplastic resin are good. When the volume average particle diameter of the graft copolymer (G1) is 2000 nm or less, the color rendering properties and the impact resistance (in particular low-temperature impact resistance) of the molded article obtained by mixing the graft copolymer (G1) in the thermoplastic resin are good, and the surface appearance is good.

The volume average particle diameter of the graft copolymer (G1) can adopt a value measured with the following method. The latex of the graft copolymer is diluted with distilled water, and the volume average median particle size is calculated using a laser diffraction scattering particle size distribution meter (SALD-7100, made by Shimadzu). The sample concentration of the latex is suitably adjusted to be within a range suitable for a scattered light intensity monitor attached to the apparatus. The standard particle matter adopts monodispersed polystyrene of which the particle diameter is known, and 12 kinds of particles of which the particle diameters are within the range of 20 to 800 nm are used.

[Graft Copolymer (G2)]

The graft copolymer (G2) of the second invention group is a copolymer obtained by graft copolymerizing one or more vinyl monomers on the polyorganosiloxane-based rubber. The graft portion of the graft copolymer (G2) preferably has a glass transition temperature Tg represented by the Fox equation exceeding 0° C., more preferably 50° C., and still more preferably 80° C. or more.

Examples of the "vinyl monomer" include: aromatic vinyl monomers, such as styrene, α-methylstyrene, and vinyl toluene, etc.; (meth)acrylate esters, such as methyl(meth) acrylate, ethyl(meth)acrylate, butyl(meth)acrylate, and 2-ethylhexyl(meth)acrylate, etc.; and acrylonitrile monomers, such as acrylonitrile and methacrylonitrile, etc. The compounds can be used alone, or in combination of two or more.

To make the Tg of the graft portion exceed 0° C., a vinyl monomer of which the homopolymer has a Tg exceeding 0° C. is preferably used in an amount of 50 mass % or more, more preferably 80 mass % or more. In particular, the mass % is a value based on the total amount of 100 mass % of the vinyl monomer for graft polymerization.

Examples of the vinyl monomer of which the homopolymer has a Tg exceeding 0° C. include: alkyl methacrylates, such as methyl methacrylate, ethyl methacrylate, n-butyl methacrylate, and isobutyl methacrylate, etc.; alkyl acrylates such as methyl acrylate, etc. The compounds can be used alone, or in combination of two or more.

In such case, an alkyl acrylate such as ethyl acrylate or n-butyl acrylate of which the homopolymer has a Tg of 0° C. or less can also be used as a vinyl monomer. The content of the alkyl acrylate of which the homopolymer has a Tg of 0° C. or less is preferably 0.05 to 20 mass % in 100 mass % of the vinyl monomer.

The content of the polyorganosiloxane-based rubber in 100 mass % of the graft copolymer (G2) is preferably 10 to 99 mass %. As the content of the polyorganosiloxane-based rubber is 10 mass % or more, the impact strength of the molded article under low temperature is good. Moreover, in the case of 99 mass % or less, the surface appearance of the molded article is good. From the perspective of increasing the chemical resistance of the resin composition, the content of the polyorganosiloxane-based rubber is preferably 60 to 97 mass %, and more preferably 75 to 95 mass %.

For the graft copolymer (G2), from the perspective of increasing the chemical resistance and the thermal decomposition resistance of the resin composition, the vinyl monomer mixture for graft polymerization preferably contains a "crosslinking monomer".

Examples of the crosslinking monomer include the following polyfunctional monomers: allyl methacrylate, triallyl cyanurate, triallyl isocyanurate, divinylbenzene, ethylene glycol dimethacrylate, propylene glycol dimethacrylate, 1,3-butylene glycol dimethacrylate, 1,4-butylene glycol dimethacrylate, 1,6-hexanediol diacrylate, and triallyl trimellitate, etc. The compounds can be used alone, or in combination of two or more.

The content of the component derived from the crosslinking monomer in the graft copolymer is preferably 0.5 to 2.0 mass %, more preferably 0.5 to 1.0 mass %, in 100 mass % of the graft copolymer. When the content of the component is 0.5 mass % or more, the chemical resistance and the thermal decomposition resistance of the molded article are good; and when 2.0 mass % or less, the impact strength of the molded article is good.

The content of the crosslinking monomer in the monomer mixture for graft polymerization is preferably 0.5 to 10 mass %, more preferably 0.5 to 5 mass %, in 100 mass % of the monomer mixture for graft polymerization. When the content of the crosslinking monomer is 0.5 mass % or more, the chemical resistance and the thermal decomposition resistance of the molded article are good, and when 5 mass % or less, the impact strength of the molded article is good.

In the graft copolymer (G2), from the perspective of increasing the chemical resistance of the resin composition, the sp value of the graft portion calculated with the Fedors method is preferably 20.15 to 21.00. When the sp value is 20.15 or more, the chemical resistance of the molded article is good; and when 21.00 or less, the impact strength of the molded article is good.

The sp value of the graft portion is calculated based on the respective sp values of the vinyl monomers recited in the Polymer Handbook, vol. 1 (Wiley-Interscience) calculated with the Fedors method. In the case that the vinyl monomer mixture contains 3 vinyl monomers, the sp value is calculated with the following equation.

$$sp\ \text{value}[(J/cm^3)^{0.5}] = Asp \times Amo + Bsp \times Bmo + Csp \times Cmo \quad \text{Equation (2)}$$

Asp: sp value of vinyl monomer A
Bsp: sp value of vinyl monomer B
Csp: sp value of vinyl monomer C
Amo: mole fraction of vinyl monomer A
Bmo: mole fraction of vinyl monomer B
Cmo: mole fraction of vinyl monomer C $$Amo + Bmo + Cmo = 1.$$

The sp value of the graft portion can be adjusted via the composition of the used vinyl monomer. For instance, by using a small amount of methacrylate (sp value of 23.43), 2-hydroxyethyl methacrylate (sp value of 24.98), or phenyl methacrylate (sp value of 20.95) in methyl methacrylate (sp value of 20.15), the sp value of the graft portion can be adjusted to 20.15 to 21.00.

Moreover, in the graft copolymer (G2), from the perspective of increasing the thermal decomposition resistance of the resin composition, the vinyl monomer mixture for grafting preferably contains an aromatic vinyl monomer, such as styrene, a-methylstyrene or vinyltoluene, etc. The compounds can be used alone, or in combination of two or more.

The content of the aromatic vinyl monomer is preferably 10 to 90 mass %, more preferably 30 to 80 mass %, and still more preferably 40 to 70 mass %, in 100 mass % of the monomer mixture for graft polymerization. When the content of the aromatic vinyl monomer is 10 mass % or more, the thermal decomposition resistance of the resin composition is good, and when 90 mass % or less, the impact resistance of the molded article is good, which is preferred.

The particle diameter of the graft copolymer (G2) measured with absorptiometry is preferably 300 to 2000 nm, more preferably 300 to 800 nm, and still more preferably 350 to 650 nm. The particle diameter is a particle diameter calculated from the absorbance of the latex. The measuring method is described later. If the particle diameter is less than 300 nm, the pigment coloring properties and the chemical resistance of the resin composition are reduced, which is unsatisfactory. If the particle diameter exceeds 2000 nm, the appearance of the resin composition is degraded, which is unsatisfactory.

[Method for Producing Graft Copolymer]

Examples of the method for polymerizing the graft portion include: a method where a vinyl monomer for graft polymerization is added in the latex of the polyorganosiloxane-based rubber and polymerization is performed in one step or in multiple steps. When the polymerization is performed in multiple steps, a vinyl monomer for graft polymerization is preferably stepwise or continuously added in the latex of the polyorganosiloxane-based rubber. Such polymerization method can yield a latex of a graft copolymer having good polymerization stability and having the desired particle diameter and particle diameter distribution in a stable manner.

In polymerizing the graft portion, an emulsifier can be further added as needed. The emulsifier can include the same emulsifier above used in the production of the composite rubber, and an anionic emulsifier and a nonionic emulsifier are preferred.

The polymerization initiator used in the polymerization of the graft portion can include the same polymerization initiator used in the production of the composite rubber, and preferably includes an azo-based initiator or a redox-based initiator.

In the case that the powder of the graft copolymer is collected from a latex of the graft copolymer, any method such as a spray drying method or a coagulation method can be used.

The spray drying method is a method in which the latex of the graft copolymer is sprayed as micro droplets in a dryer, and the droplets are brought in contact with a heating gas for drying. Examples of the means for generating the micro droplets include: a rotating disk, a pressure nozzle, a dual fluid nozzle, and a pressurized dual fluid nozzle. The capacity of the dryer can be any of the small capacity used in laboratories to the large capacity used in industries. The temperature of the heating gas for drying is preferably 200° C. or less, more preferably 120° C. to 180° C. Alternatively, the latex of two or more graft copolymers respectively produced can be spray dried together. Moreover, to prevent blocking during the spray drying to improve powder characteristics such as bulk specific gravity, arbitrary component such as silicon dioxide can also be added in the latex of the graft copolymer to perform spray drying.

The coagulation method is a method in which the latex of the graft copolymer is condensated, and then the graft copolymer is separated to perform collection and drying. First, the latex of the graft copolymer is put in hot water in which a coagulant is dissolved to perform salting and coagulation to separate the graft copolymer. Then, dehydration, etc. is performed on the separated moist graft copolymer, and the graft copolymer for which the water amount is reduced is collected. The collected graft copolymer can be dried using a squeeze dehydrator or a hot air dryer.

Examples of the coagulant include: inorganic salts, such as aluminum chloride, aluminum sulfate, sodium sulfate, magnesium sulfate, sodium nitrate, and calcium acetate, etc.; acids, such as sulfuric acid, etc.; and so on, wherein calcium acetate is particularly preferred. The coagulants can be used alone, or in combination of two or more. When used together, a combination in which water-insoluble salt is not formed needs to be selected. For instance, if calcium acetate is used with sulphuric acid or sodium salt thereof, water-insoluble calcium salt is formed, which is unsatisfactory.

The coagulant is generally made into an aqueous solution for use. Regarding the concentration of the aqueous coagulant solution, from the perspective of performing collection by making the graft copolymer coagulate in a stable manner, 0.1 mass % or more is preferred, and 1 mass % or more is more preferred. Moreover, if the amount of the coagulant remaining in the collected graft copolymer is large, the thermal decomposition resistance of the molded article is degraded, so the concentration of the aqueous coagulant solution is preferably 20 mass % or less, and more preferably 15 mass % or less. The amount of the aqueous coagulant solution relative to the latex is not particularly limited, and is preferably 10 to 500 mass parts relative to 100 mass parts of the latex.

The method of bringing the latex in contact with the aqueous coagulant solution is not particularly limited, and the following methods can usually be used: 1) a method in which the aqueous coagulant solution is stirred while the latex is continuously added therein and maintained for a certain period of time, and 2) a method in which the aqueous coagulant solution and the latex are continuously injected into a container provided with a stirrer in a certain ratio to make them be in contact with each other, and a mixture containing condensated polymer and water is continuously extracted from the container. The temperature when the latex and the aqueous coagulant solution are in contact is not particularly limited, and is preferably 30° C. to 100° C. The contact time is not particularly limited.

The condensated graft copolymer is washed with water in a mass of about 1 to 100 times, and a flow dryer or a squeeze dehydrator, etc. is used to dry the moist graft copolymer separated by filtration. The drying temperature and the drying time can be suitably determined by the Tg of the obtained graft copolymer. Moreover, it is also possible that the graft copolymer discharged from the squeeze dehydrator or an extruder is not collected but is directly fed to the extruder or a molding machine for producing a resin composition and mixed with the thermoplastic resin to obtain a molded article.

In the invention, from the perspective of the thermal decomposition resistance when the resin composition is produced, a coagulation method is preferably used to collect the graft copolymer.

[Impact Strength, Total Light Transmittance, and Flame Retardance]

The polyorganosiloxane-containing graft copolymer (G1) of the first invention group preferably allows a test piece thereof produced under a production condition 1 below to have a Charpy impact strength ($kJ/m^2$), a total light transmittance (%) and a flame retardance (all measured under an evaluation condition 2 below) meeting performance conditions 1) to 3):

1) $15 \leq$ Charpy impact strength $\leq 70$,

2) $60 \leq$ Charpy impact strength+total light transmittance$\times$ 1.36, and 3) the flame retardance of a thickness of 1/16 inch in a vertical flame test of UL94 standard is "V-1" or above.

The production condition 1 of the test piece includes the following steps.

A resin composition obtained by mixing 1) an aromatic polycarbonate resin having a viscosity average molecular weight of 22,000 (Iupilon S-2000F made by Mitsubishi Engineering-Plastics Corporation) in 100 mass parts, 2) the polyorganosiloxane-containing graft copolymer (G1) in 5.5 mass parts, 3) an acrylic acid-modified polytetrafluoroethylene (Metablen A-3800 made by Mitsubishi Rayon Co., Ltd.) in 0.5 mass part, and 4) an aromatic phosphate-based flame retardant (PX-200 made by Daihachi Chemical Industry Co., Ltd.) in 5.5 mass parts is provided to a devolatilization extruder (PCM-30 made by Ikegai Corp) heated to a barrel temperature of 280° C., and kneading was performed under the condition of a screw speed of 150 rpm to obtain particles. The particles were provided to a 100 ton injection molding machine (SE-100DU made by Sumitomo Heavy Industries, Ltd.), and molding was performed under the conditions of a material cylinder temperature of 280° C. and a mold temperature of 90° C. to obtain each of the following test pieces:

i) a test piece 1 (length: 80.0 mm, width: 10.0 mm, thickness: 4 mm, provided with a V-shaped notch) provided with a Charpy notch for the impact strength evaluation, ii) a test piece 2 (length: 100 mm, width: 50 mm, thickness: 2 mm) for the total light transmittance evaluation, and iii) a test piece 3 (length: 127 mm, width: 12.7 mm, thickness: 1.6 mm) having a thickness of 1/16 inches for the flame retardance evaluation.

The evaluation condition 2 includes the following items.

[Charpy Impact Strength (kJ/m$^2$)]

The Charpy impact strength of the test piece 1 was measured at a temperature of −30° C. according to JIS K 7111-1/1eA.

[Total Light Transmittance (%)]

The total light transmittance of the test piece 2 to a D65 light source was measured using a hazemeter NDH4000 made by Nippon Denshoku Industries Co., Ltd. according to JIS K 7375.

[Flame Retardance]

The total burn time of 5 "test piece 3" was measured according to a vertical flame test method of a UL94V test.

More preferably, each of the test pieces meets the following performance conditions 11), 12) and 13):

11) 25≤Charpy impact strength≤70, 12) 60≤Charpy impact strength+total light transmittance× 1.36, and 13) the flame retardance of a thickness of 1/16 inch in a vertical flame test of UL94 standard is "V-1" or above.

Still more preferably, each of the test pieces meets the following performance conditions 21), 22) and 23):

21) 25≤Charpy impact strength≤40, 22) 60≤Charpy impact strength+total light transmittance× 1.36≤100, and 23) the flame retardance of a thickness of 1/16 inch in a vertical flame test of UL94 standard is "V-0" or above.

By meeting condition 1), the obtained molded article has a low-temperature impact strength at a level sufficient for practical use. By meeting condition 2), a molded article having a superior balance between high color rendering properties and low-temperature impact resistance can be obtained. By meeting condition 3), the obtained molded article has a flame retardance sufficient for practical use.

An increase in Charpy impact strength can be achieved with, e.g., the following methods: increasing the volume average particle diameter of the graft copolymer (G1), using a component derived from the (meth)acrylate ester ($b_1$) in the graft component, and so on. An increase in the total light transmittance can be achieved by, for example, making the polyorganosiloxane content of the graft copolymer (G1) 0.1 to 69 mass %. A performance that the flame retardance is "V-1" or above can be achieved with, e.g., the following methods: increasing the volume average particle diameter of the graft copolymer (G1), using a component derived from the aromatic vinyl monomer ($b_2$) in the graft component, and so on.

<Powder of Graft Copolymer (G2)>

The powder of the polyorganosiloxane-containing graft copolymer (G2) of the second invention group is the powder of the graft copolymer (G2). The powder can also contain a (co)polymer other than the graft copolymer (G2). The so-called other (co)polymer is, for instance, a (co)polymer obtained through polymerization without graft bonding to the polyorganosiloxane-based rubber when the vinyl monomer is graft polymerized.

In the invention of the first embodiment of the second invention group, the particle diameter of the graft copolymer (G2) measured with absorptiometry is 300 to 2000 nm, the alkali metal content of the powder is 0 to 20 ppm, and the alkaline earth metal content is 0 to 150 ppm.

If the alkali metal amount exceeds 20 ppm, the thermal decomposition resistance of the resin composition obtained from the powder and the resin is reduced, which is unsatisfactory. In particular, the alkali metal catalytically decomposes the aromatic polycarbonate resin, so the content needs to be inhibited to 20 ppm or less, preferably 1 to 15 ppm. For the alkali metals, the total content of potassium and sodium in particular needs to be inhibited. The method for measuring the alkali metal content is as described later.

Examples of the method for making the alkali metal content of the powder 0 to 20 ppm include 1) a method where no alkali metal salt is used as an emulsifier or polymerization initiator in the graft polymerization, or the usage amount of such substances is inhibited, 2) a method where the powder collected through spraying or coagulation is cleaned by water or an organic solvent, etc., and 3) a method in which the two methods are combined.

Moreover, the content of the alkaline earth metal of the powder of the graft copolymer (G2) is 0 to 150 ppm. If the content of the alkaline earth metal exceeds 150 ppm, the thermal decomposition resistance of the resin composition obtained from the powder and a resin is reduced, which is unsatisfactory. The effect of the alkaline earth metal is weaker compared to the alkali metal, but the alkaline earth metal catalytically decomposes the aromatic polycarbonate resin in particular, so its content has to be inhibited to 150 ppm or less, preferably 10 to 140 ppm. For the alkaline earth metals, the total content of calcium and magnesium in particular needs to be inhibited. The method for measuring the alkaline earth metal content is described later.

Examples of the method for making the alkaline earth metal content of the powder 0 to 150 ppm include: 1) a method where no alkaline earth metal salt is used as an emulsifier or a polymerization initiator in the graft polymerization or as a condensation agent in the coagulation collection, or the usage amount of such substances is inhibited, 2) a method where the powder collected through spraying or coagulation is washed with water or an organic solvent, etc., and 3) a method in which the two methods are combined.

In particular, in a case that sodium formaldehydesulfoxylate is used as a reducing agent in a redox-based initiator as the polymerization initiator, if an alkaline earth metal type condensation agent is used to perform coagulation collection, the polymerization initiator remains in the powder containing the graft copolymer in the form of an alkaline earth metal salt. The thermal decomposition resistance of the resin composition obtained from the powder and a resin is reduced by the alkaline earth metal salt, so a method where sodium formaldehydesulfoxylate is not used or the usage amount thereof is inhibited is preferred.

Moreover, the sulfur content of the powder of the graft copolymer (G2) is preferably 0 to 200 ppm. The sulfur content is the indicator of the amount of sulfate remaining in the powder. Sulfate is a collective term for oxyacids of sulfur such as sulfuric acid, sulfonic acid and sulfinic acid, and salts thereof. Sulfate in particular catalytically decomposes the aromatic polycarbonate resin, and therefore the content thereof needs to be inhibited to a sulfur content of 200 ppm or less, preferably 10 to 190 ppm. If the sulfur content exceeds 200 ppm, the thermal decomposition resistance of the resin composition is reduced, which is unsatisfactory. The method for measuring the sulfur content is as described later.

Examples of the method for making the sulfur content in the powder 0 to 200 ppm include: 1) a method where no sulfate is used as an emulsifier or a polymerization initiator in the graft polymerization, or the usage amount of such substances is inhibited, 2) a method where the powder collected through spraying or coagulation is washed with water or an organic solvent, etc., and 3) a method in which the two methods are combined.

In particular, in the case that sodium formaldehydesulfoxylate is used as a reducing agent in a redox-based initiator as the polymerization initiator, the polymerization initiator remains in the form of sulfate in the graft copolymer powder. The thermal decomposition resistance of a resin composition obtained from the powder and a resin is reduced by sulfate, so a method in which sodium formaldehydesulfoxylate is not used or the usage amount thereof is inhibited is preferred.

In the invention of the second embodiment of the second invention group, the powder of the graft copolymer (G2) is a powder of the polyorganosiloxane-containing graft copolymer obtained by graft polymerizing vinyl monomers on a polyorganosiloxane-based rubber, wherein the vinyl monomers form a monomer mixture containing an aromatic vinyl monomer, the alkali metal content of the powder is 0 to 20 ppm, and the alkaline earth metal content of the powder is 0 to 150 ppm. The monomer mixture containing an aromatic vinyl monomer is used as the vinyl monomers for graft polymerization, and therefore a resin composition having superior thermal decomposition resistance and impact resistance can be obtained.

The powder preferably allows, for a resin composition therefrom used in the following production condition 11, the number of generated silver streaks measured under an evaluation condition 12 described below to be 0.

The production condition 11 of the resin composition and the test piece is described below.

The following materials 1) to 5) are mixed:
1) the powder of the polyorganosiloxane-containing graft copolymer (G2) in 4 mass parts,
2) an aromatic polycarbonate resin having a viscosity average molecular weight of 22,000 (Iupilon S-2000F made by Mitsubishi Engineering-Plastics Corporation) in 96 mass parts,
3) Irganox1076 (made by BASF Corporation) in 0.1 mass part,
4) Adekastab 2112 (made by Adeka Corporation) in 0.1 mass part, and
5) carbon black #960 (made by Mitsubishi Chemical Corporation) in 0.1 mass part.

The mixture is provided to a devolatilization extruder (PCM-30 made by Ikegai Corp) heated to a barrel temperature of 280° C., and kneading was performed under the condition of a screw speed of 150 rpm to obtain particles of the resin composition. Then, a 100 ton injection molding machine (SE-100DU made by Sumitomo Heavy Industries, Ltd.) and a mold having a hot runner (test piece dimension: longitude 100 mm×transverse 100 mm×thickness 2 mm, pin gate) to perform molding on the particles under the conditions of a material cylinder temperature of 310° C., a runner temperature of 310° C., and a mold temperature of 90° C. to produce an injection molding article of a first shot. After the first-shot molding of the injection molding machine, another shot of molding is further performed after the resin composition was kept in the injection molding machine for 6 min to obtain a test piece 11.

<Evaluation Condition 12 (Thermal Decomposition Resistance)>

The number of silver streaks generated near the gate of the test piece 11 is visually confirmed.

Regarding the resin composition used in the production condition 11, in order to make the number of generated silver streaks measured under the evaluation condition 12 be zero, it is possible to make the vinyl monomer mixture for the graft polymerization for forming the graft copolymer (G2) contain, for instance, an aromatic vinyl monomer or a crosslinking monomer.

The content of the aromatic vinyl monomer is preferably 10 to 90 mass %, more preferably 30 to 80 mass %, and still more preferably 40 to 70 mass %, in 100 mass % of the monomer mixture for graft polymerization.

The content of the component derived from the crosslinking monomer in the graft copolymer (G2) is preferably 0.5 to 2.0 mass %, more preferably 0.5 to 1.0 mass %, in 100 mass % of the graft copolymer. The content of the crosslinking monomer in 100 mass % of the monomer mixture for graft polymerization is preferably 0.5 to 10 mass %, and more preferably 0.5 to 5 mass %.

Moreover, the powder particularly preferably allows, for a resin composition used in the production condition 11, the L* value measured under the following evaluation condition 13 to be 20 or less.

<Evaluation Condition 13 (Color Rendering Properties)>:

The particles of the resin composition are provided to a 100 ton injection molding machine (SE-100DU made by Sumitomo Heavy Industries, Ltd.), and molding was performed under the conditions of a material cylinder temperature of 310° C. and a mold temperature of 90° C. to obtain a test piece 13 (length: 100 mm, width: 50 mm, thickness: 2 mm)

With JIS Z 8729 (a representation method for an object color in an L*a*b* color system), the object color of the test piece 13 was measured based on JISZ8722 using a spectroscopic colorimeter SE-2000 made by Nippon Denshoku Industries Co., Ltd., under conditions of an apparatus being a spectroscopic colorimeter SE-2000 (made by Nippon Denshoku Industries Co., Ltd., with after-sample light splitting of 0° to 45°), a measuring range of 380 nm to 780 nm, and a measuring light source of C light (2° field of view).

The L* value was calculated from the tristimulus values (XYZ) using a CIE color difference formula.

<Thermoplastic Resin Composition 1>

The graft copolymer (G1) of the first invention group can be mixed with a thermoplastic resin (A) to form a thermoplastic resin composition, which preferably contains a thermoplastic resin (A), a graft copolymer (G), a fluorine resin (C) and a flame retardant (D).

[Thermoplastic Resin (A)]

Examples of the thermoplastic resin (A) include: olefin-based resins, such as polypropylene (PP) and polyethylene (PE), etc.; styrene (St)-based resins, such as polystyrene (PS), high-impact polystyrene (HIPS), a (meth)acrylate-styrene copolymer (MS), a styrene-acrylonitrile copolymer (SAN), a styrene-maleic anhydride copolymer (SMA), an acrylonitrile-butadiene-styrene copolymer (ABS), an acrylate-styrene-acrylonitrile copolymer (ASA), and an acrylonitrile-ethylene-propylene rubber-styrene copolymer (AES), etc.; acrylic (Ac) resins, such as polymethyl methacrylate (PMMA), etc.; polycarbonate-based resins (PC-based resins); polyamide (PA) resins; PEs resins, such as polyethylene terephthalate (PET), polybutylene terephthalate (PBT), and polylactic acid (PLA), etc.; engineering plastics, such as a (modified) polyphenylene ether ((m-)PPE) resin, a polyoxymethylene (POM) resin, a polysulfone (PSO) resin, a polyarylate (PAr) resin, and a polyphenylene sulfide (PPS) resin, etc.; thermoplastic polyurethane (PU) resins; polymer alloys, such as an alloy of a PC resin and an St-based resin such as PC/ABS, an alloy of a PVC-based resin and an St-based resin such as polyvinyl chloride (PVC)/ABS, an alloy of a PA resin and an St-based resin such as PA/ABS, an alloy of a PA resin and triphenyl phosphate (TPE), an alloy of a PA resin and a polyolefin-based resin such as PA/PP, an alloy of a PC resin and a PEs resin such as PC/PBT, an alloy of olefin-based resins such as a polyolefin-based resin/TPE and PP/PE, an alloy of PPE-based resins such as PPE/HIPS, PPE/PBT and PPE/PA, and an alloy of a PVC-based resin and an Ac-based resin such as PVC/PMMA; and PVC-based resins, such as a rigid vinyl chloride resin, a semi-rigid vinyl chloride resin, and a soft vinyl chloride resin, etc.

Regarding the thermoplastic resin (A), from the perspective of increasing the impact resistance and the flame retardance of the obtained molded article, a thermoplastic resin having at least one bond selected from a carbonate bond, an ester bond and an amide bond is preferred. Examples of the thermoplastic resin having at least one bond selected from a carbonate bond, an ester bond and an amide bond include a PC-based rein, PBT, PET, a PA resin, and PLA. Moreover, a resin referred to as an alloy blend containing the above resins can also be used. Moreover, an aromatic polycarbonate-based resin is preferred.

The aromatic polycarbonate-based resin is a thermoplastic aromatic polycarbonate polymer or copolymer that is obtained by reacting an aromatic hydroxyl compound, or an aromatic hydroxyl compound and a small amount of a polyhydroxyl compound, with phosgene or a diester of carbonic acid, and may have a branched chain. The method for producing the aromatic polycarbonate resin is not particularly limited, and a known method can be used, such as a phosgene method (interfacial polymerization method) or melting method (transesterification method). The terminal OH-group of the PC-based resin tends to affect, e.g., thermal stability and hydrolytic stability, and therefore in the invention, by performing production with a melting method and adjusting the degree of decompression in the reaction, an aromatic polycarbonate resin of which the terminal OH-group amount have been adjusted can also be used.

Examples of the PC-based rein include: products from Mitsubishi Engineering-Plastics Corporation, such as Iupilon S-1000, Iupilon S-2000, Iupilon S-3000, Iupilon H-3000 and Iupilon H-4000; and products from Teijin Chemicals Ltd., such as Panlite L1250, Panlite L1225 and Panlite K1300, etc.

The amount of the used graft copolymer (G1) relative to 100 mass parts of the thermoplastic resin (A) is preferably 0.5 to 90 mass parts, more preferably 0.5 to 20 mass parts, and still more preferably 1 to 7 mass parts. When the amount of the used graft copolymer (G1) is 0.5 to 90 mass parts, a resin composition having superior impact resistance and surface appearance can be obtained.

[Fluorine Resin (C)]

The fluorine resin (C) can be used to prevent dripping during burning. Examples of the fluorine resin (C) include polytetrafluoroethylene and a modified polytetrafluoroethylene, etc. Examples of the modified polytetrafluoroethylene include SAN-modified polytetrafluoroethylene and acrylic acid-modified polytetrafluoroethylene, etc.

A known fluorine resin (C) can be used, a suitable synthesized fluorine resin (C) can be used, and a commercial product can also be used. Examples of the commercial products include: polytetrafluoroethylenes, such as Polyflon FA-500 (trade name, by Daikin Industries, Ltd.), etc.; SAN-modified polytetrafluoroethylenes, such as BLENDEX B449 (trade name, by GE Specialty Chemicals), etc.; acrylic acid-modified polytetrafluoroethylenes, such as Metablen A-3000, Metablen A-3750 and Metablen A-3800 (trade names, made by Mitsubishi Rayon Co., Ltd.), etc. The fluorine resins (C) can be used alone, or in combination of two or more.

From the perspective of superior dispersibility of the obtained molded article and superior mechanical properties, heat resistance and flame retardance of the molded article, the fluorine resin (C) preferably includes SAN-modified polytetrafluoroethylene or acryl-modified polytetrafluoroethylene, more preferably acryl-modified polytetrafluoroethylene.

The content of polytetrafluoroethylene in the SAN-modified polytetrafluoroethylene or the acrylic-modified polytetrafluoroethylene is preferably 10 to 80 mass %, more preferably 20 to 70 mass %, in 100 mass % of the fluorine resin (C). As the content of the polytetrafluoroethylene in SAN-modified polytetrafluoroethylene or acrylic acid-modified polytetrafluoroethylene is 10 mass % or more, the flame retardance of the obtained molded article is superior. As the content of polytetrafluoroethylene in the SAN-modified or acrylic-modified polytetrafluoroethylene is 80 mass % or less, the appearance of the obtained molded article is superior.

The amount of the fluorine resin (C) is, relative to 100 mass parts of the thermoplastic resin (A), preferably 0.01 to 10 mass parts, more preferably 0.1 to 5 mass parts, and still more preferably 0.3 to 2 mass parts. As the amount of the fluorine resin (C) is 0.01 mass part or more, the flame retardance of the obtained molded article is superior. As the amount is 10 mass parts or less, the original qualities of the thermoplastic resin (A) are not compromised.

[Flame Retardant (D)]

The flame retardant (D) can be a known flame retardant, of which the examples include a halogen-based flame retardant as a combination of a halogen compound such as halogenated bisphenol A, halogenated polycarbonate oligomer or a brominated epoxy compound, and a flame retardant auxiliary such as antimony oxide; an organic salt-based flame retardant; a phosphorus-based flame retardant such as a phosphate ester-based flame retardant or a halogenated phosphate ester-type flame retardant; a sulfonic flame retardant such as a metal salt of an aromatic sulfonic acid or a metal salt of a perfluoroalkyl sulfonic acid; and a silicone-based flame retardant such as organosiloxane such as a branched phenyl silicone compound or a phenyl silicone-based resin.

From the perspective of superior flame retardance of the obtained molded article, the flame retardant (D) preferably includes a phosphorus-based flame retardant such as a phosphate ester-based flame retardant, or an organic metal salt-based flame retardant such as a metal salt of an aromatic sulfonic acid or a metal salt of a perfluoroalkyl sulfonic acid.

Examples of the phosphate ester-based flame retardant include: trimethyl phosphate, triethyl phosphate, tributyl phosphate, trioctyl phosphate, tributoxyethyl phosphate, triphenyl phosphate, tricresyl phosphate, cresyl diphenyl phosphate, octyl diphenyl phosphate, isopropyl phenyl diphosphate, tris(butoxyethyl)phosphate, triisobutyl phosphate, bis(isopropylphenyl)diphenylphosphate, tris(isopropylphenyl)phosphate, 1,3-phenylene bis(diphenyl phosphate), 1,3-phenylene bis(di-2,6-xylenyl phosphate), bisphenol A bis(diphenyl phosphate), resorcinol bis(diphenyl phosphate), octyl diphenyl phosphate, diethylene ethyl phosphate, dihydroxy propylene butyl phosphate, ethylene disodium phosphate, t-butylphenyl diphenyl phosphate, bis(t-butylphenyl)phenyl phosphate, tris(t-butylphenyl)phosphate, tris(chloroethyl) phosphate, tris(dichloropropyl)phosphate, tris(chloropropyl) phosphate, bis(2,3-dibromopropyl) 2,3-dichloropropyl phosphate, methylphosphonic acid, dimethyl methylphosphonate, diethyl methylphosphonate, ethylphosphonic acid, propylphosphonic acid, butylphosphonic acid, 2-methylpropylphosphonic acid, t-butylphosphonic acid, 2,3-dimethylbutylphosphonic acid, octylphosphonic acid, phenylphosphonic acid, diethylphosphinic acid, methylethylphosphinic acid, methylpropylphosphinic acid, dioctylphosphinic acid, phenylphosphinic acid, diethylphenylphosphinic acid, diphenylphosphinic acid, and an alkyl phosphate, etc. The compounds can be used alone, or in combination of two or more.

The organic salt-based flame retardant displays flame retardance effect in a very small addition amount, and is therefore beneficial in terms of not easily reducing the heat resistance of the molded article and providing greater antistatic properties to the molded article. The most advantageous organic metal salt-based flame retardant in the invention is a fluorine-containing organic metal salt compound, which refers to a metal salt compound containing an anion component and a cation component, wherein the anion component contains an organic acid having a fluorine-substituted hydrocarbon group, and the cation component contains a metal ion. In particular, a metal salt of a fluorine-substituted organic sulfonic acid, a metal salt of a fluorine-substituted organic sulfate ester, and a metal salt of a fluorine-substituted organophosphate ester are preferred. The fluorine-containing organic metal salt compounds can be used alone, or in combination of two or more. In particular, a metal salt of a fluorine-substituted organic sulfonic acid is preferred, and a metal salt of a sulfonic acid having a perfluoroalkyl group is more preferred.

Moreover, the organic salt-based flame retardant other than the fluorine-containing organic metal salt compound is preferably a metal salt of an organic sulfonic acid without a fluorine atom. Examples of the metal salt are a metal salt of an aliphatic sulfonic acid or a metal salt of an aromatic sulfonic acid. In particular, a metal salt of an aromatic sulfonic acid is preferred.

Examples of the metal forming the metal ion of the organic metal salt-based flame retardant include: alkali metals such as sodium and potassium, and alkaline earth metals such as calcium. Specifically examples of the organic metal salt-based flame retardant include potassium salt of 4-methyl-N-(4-methylphenyl)sulfonyl-benzenesulfonamide, potassium diphenylsulfone-3-sulfonate, potassium diphenylsulfone-3,3'-disulfonate, sodium p-toluenesulfonate, and potassium salt of perfluorobutanesulfonic acid, etc. The compounds can be used alone, or in combination of two or more.

The amount of the flame retardant (D) is preferably 0.01 to 20 mass parts based on 100 mass parts of the thermoplastic resin (A). When the amount of the flame retardant (D) is 0.01 mass part or more, the flame retardance of the obtained molded article is superior. When the amount of the flame retardant (D) is 20 mass parts or less, the original qualities of the thermoplastic resin (A) are not compromised.

Moreover, the most suitable amount is different according to the type of the flame retardant (D). The amount of the phosphate-based flame retardant is more preferably 1 to 10 mass parts, and that of the organic metal salt-based flame retardant is more preferably 0.01 to 2 mass parts.

[Antioxidant (E)]

The thermoplastic resin composition of the first invention group can contain an antioxidant (E) as needed. The antioxidant (E) is a component that not only is used for inhibiting resin oxidative decomposition when a molded article is produced, but also is used for increasing the flame retardance of the molded article. The antioxidant (E) is not particularly limited as long as it can be used in regular molding. Specific examples include: phenol-based antioxidants, such as tris[N-(3,5-di-t-butyl-4-hydroxylbenzyl)]isocyanurate (by ADEKA Corp., such as Adekastab AO-20), tetrakis[3-(3,5-di-t-butyl-4-hydroxylphenyl)propionyloxymethyl]methane (by BASF Corporation, such as Irganox1010), bis (3-t-butyl-4-hydroxyl-5-methylbenzenepropionic acid)ethylene bis(oxyethylene) (by BASF Corporation, such as Irganox 245), octadecyl 3,5-di-t-butyl-4-hydroxylbenzene propionate (by BASF Corporation, such as Irganox 1076), butylidene-1,1-bis-(2-methyl-4-hydroxyl-5-t-butyl-phenyl) (by ADEKA Corp, such as Adekastab AO-40), and 1,1,3-tris(2-methyl-4-hydroxyl-5-t-butylphenyl)butane (by Yoshitomi Fine Chemical Co., Ltd., such as Yoshinox 930), etc.; phosphorus-based antioxidants, such as bis(2,6-di-t-butyl-4-methylphenyl)pentaerythritolphosphite (by ADEKA Corp., such as Adekastab PEP-36), tris(2,4-di-t-butylphenyl)phosphite (by ADEKA Corp., such as Adekastab 2112), and 2,2-methylene bis(4,6-di-t-butyl phenyl) octylphosphite (by ADEKA Corp., such as Adekastab HP-10), etc.; and sulfur-based antioxidants, such as dilauryl 3,3'-thio-dipropionate (by Yoshitomi Fine Chemical Co., Ltd., such as Yoshinox DLTP) and dimyristyl 3,3'-thiodipropionate (by Yoshitomi Fine Chemical Co., Ltd., such as Yoshinox DMTP), etc.

The amount of the antioxidant (E) is preferably 0.05 to 2 parts and more preferably 0.05 to 0.8 parts relative to 100 mass parts of the thermoplastic resin (A). When the amount of the antioxidant (E) is 0.05 part or more, the flame retardance of the obtained molded article is superior. When the amount of the antioxidant (E) is 2 parts or less, reduction in impact resistance of the obtained molded article is inhibited.

[Other Additives]

The thermoplastic resin composition of the first invention group can further contain the following components as needed: a plasticizer or a lubricant, a release agent (such as pentaerythritol tetrastearate), a nucleating agent, an antistatic agent, a stabilizer, a filler material, a reinforcing material (glass fiber, carbon fiber, mica, kaolin, talc, $CaCO_3$, or glass flake), and a pigment. The components can be used alone, or in combination of two or more.

[Method for Preparing Resin Composition]

The method for preparing the thermoplastic resin composition of the first invention group is not particularly limited. In an example thereof, the thermoplastic resin (A), the graft copolymer (G1), the optional fluorine resin (C), flame retardant (D), antioxidant (E) and various additives are mixed and dispersed by, e.g., a V-type stirrer or a Henschel mixer, and the mixture is melted and kneaded in a kneading machine such as an extruder, a Banbury mixer, a pressure kneader, or a roller. The mixing of the components can be implemented in batches or continuously, and the mixing order of the components is not particularly limited. The melt-kneaded product can be made into pellets and used in various molding.

<Resin Composition 2>

The powder of the graft copolymer (G2) of the second invention group of the invention can be mixed with a resin to form a resin composition. The resin useful in the second invention group is not particularly limited, and can include, for instance, one or more resins selected from a curable resin, a thermoplastic resin, and a "thermoplastic elastomer".

The amount of the added powder of the graft copolymer (G2) relative to the resin is preferably 0.5 to 90 wt % and more preferably 0.5 to 20 wt % based on a total of 100 mass % of the resin and the powder. When the additive amount of the powder is 0.5 to 90 wt %, a resin composition having superior impact resistance and surface appearance can be obtained.

[Curable Resin]

Examples of the curable resin include an epoxy resin, a phenol resin, an unsaturated polyester resin, a melamine resin, and a urea resin. From the perspective of superior electrical characteristics and suitability for semiconductor sealing, an epoxy resin is preferred among the curable resins. The curable resins can be used alone, or in combination of two or more. The curable resin can be categorized into a thermocurable resin and a photocurable resin, and can be either one.

Examples of the epoxy resin include dicyclopentadiene-type, cresol novolac-type, phenol-based novolac-type, bisphenol-type, and diphenyl-type. The epoxy resins can be used alone, or in combination of two or more. From the perspective of good dispersibility of the powder of the graft copolymer (G2), the epoxy resin is preferably a solid.

Examples of the curing agent of the epoxy resin include a phenol-based curing agent such as a phenol novolac resin or a cresol novolac resin, etc., an amine-based curing agent, and an acid anhydride-based curing agent. The curing agents can be used alone, or in combination of two or more. The usage amount thereof is preferably the stoichiometry of the epoxy group.

Examples of the phenol-based resin include a resol-type phenol resin and a novolac phenol resin. The phenol resin can also be modified by, for instance, drying oil, a xylene resin, or a melamine resin. From the perspective of good dispersibility of the powder containing the graft copolymer, the phenol resin is preferably a solid.

In a case that the phenol resin is a novolac phenol resin, a polyamine such as hexamine, an epoxy resin, an isocyanate compound, a polyformaldehyde compound, or a resol-type phenol resin, etc. can further be used as a curing agent.

An example of the unsaturated polyester resin is obtained by reacting a saturated dibasic acid (such as isophthalic acid, phthalic acid, phthalic anhydride, succinic acid, adipic acid, or sebacic acid), a polyol (such as glycol, dipropylene glycol, 1,3-butanediol, 1,6-hexanediol, neopentyl glycol, or hydrogenated bisphenol A), and a unsaturated dibasic acid (such as maleic acid, maleic anhydride, fumaric acid, itaconic acid, or endomethylene tetrahydrophthalic anhydride) under 180° C. to 250° C.

The unsaturated polyester resin may also be a resin obtained by copolymerizing the unsaturated dibasic acid and a copolymerizable monomer. Examples of the monomer capable of being copolymerized with the unsaturated dibasic acid include styrene, t-butyl styrene, divinylbenzene, diallyl phthalate, vinyl toluene, and a (meth)acrylate.

[Thermoplastic Resin]

Examples of the thermoplastic resin include the exemplary resins for the thermoplastic resin (A). Among them, the following resins or alloys are preferred: an St-based resin, a PC resin, a PA resin, a PET resin, a PBT resin, an (m-) PPE resin, a POM resin, and a PU resin; an alloy of a PC resin and an St-based resin such as PC/ABS, an alloy of a PA resin and an St-based resin such as PA/ABS, an alloy of a PA resin and TPE, an alloy of a PA resin and a polyolefin-based resin such as PA/PP, and an alloy of a PC resin and a PEs resin such as PC/PBT; and an alloy of PPR-based resins such as PPE/PBT or PPE/PA. Moreover, a PC resin is more preferred.

[Thermoplastic Elastomer]

Examples of the thermoplastic elastomer include a styrene-based elastomer, an olefin-based elastomer, a vinyl chloride-based elastomer, a urethane-based elastomer, a polyester-based elastomer, a polyamide-based elastomer, a fluorine elastomer, 1,2-polybutadiene, and trans-1,4-polyisoprene, wherein a urethane-based elastomer, a polyester-based elastomer and a polyamide-based elastomer are preferred.

[Method for Preparing Resin Composition]

Examples of the method for preparing the resin composition (hereinafter "curable resin composition") in a case that the resin is a curable resin include: 1) a method where the components is mixed in a solution state, and 2) a method where the components are melted and mixed using, for instance, a mixer or a kneader and then crushed or tabletted after cooling.

Without departing from the object of the invention, various additives can be added in the curable resin composition. Examples of the additive include: various curing accelerators, a release agent such as silicone-oil, natural wax or synthetic wax, a filler agent such as crystalline silicon dioxide, molten silicon dioxide, calcium silicate or aluminum oxide, a fiber such as glass fiber or carbon fiber, a flame retardant such as antimony trioxide, a halogen capturing agent such as hydrotalcite or rare earth oxide, a colorant such as carbon black or colcothar, and a silane coupling agent.

Examples of the method for preparing the resin composition (hereafter "thermoplastic resin composition") in a case that the resin is a thermoplastic resin or a thermoplastic elastomer include:

1) a method in which the powder of the graft copolymer (G2) and the powder or the particulate matter of the thermoplastic resin are mixed by, e.g., a Henschel mixer or a tumbler, and then melt mixing is performed in, for instance, an extruder, a kneader, or a mixer, 2) a method in which the remaining materials are successively mixed in a previously melted thermoplastic resin.

Without departing from the object scope of the invention, various additives can be added in the thermoplastic resin composition. Examples of the additive include: a stabilizer such as a phenol-based stabilizer, a phosphorus-based stabilizer, a UV absorber or an amine-based light stabilizer, a flame retardant such as phosphorus-based, bromine-based, silicone-based, or organic metal salt-based, a modifier providing various physical properties such as hydrolysis resistance, a filler agent such as titanium dioxide or talc, a dye or a pigment, and a plasticizer.

Among the above resins, from the perspective of maximizing the inhibiting effect of outgas generation, a thermoplastic resin is preferred, and an aromatic polycarbonate resin is more preferred. The aromatic polycarbonate resin used in the thermoplastic resin composition of the second invention group can include an aromatic polycarbonate-based resin exemplified for the thermoplastic resin (A).

The method for preparing the aromatic polycarbonate resin composition is not particularly limited, and the following method can for instance be used. The powder of the graft copolymer (G2), the aromatic polycarbonate resin, and various optional additives are mixed and dispersed by, for instance, a V-type stirrer or a Henschel mixer. Then, melting and kneading are performed on the mixture in, for instance, a kneading machine such as an extruder or a Banbury mixer, a pressure kneader, or a roller.

The aromatic polycarbonate resin composition can contain the following various additives without compromising the object of the invention: a fire retardant, an anti-drip agent (such as a fluorinated polyolefin, silicone, and an aromatic polyamide fiber), a lubricant, a release agent (such as pentaerythritol tetrastearate), a nucleating agent, an antistatic agent, a stabilizer, a filler material, a reinforcing material (such as glass fiber, carbon fiber, mica, kaolin, talc, $CaCO_3$, and glass flake), and a pigment. The additives can be used alone, or in combination of two or more.

<Molded Article>

Examples of the method for forming the thermoplastic resin composition of the first invention group and the second invention group of the invention include: a molding method used in the molding of a regular thermoplastic resin composition such as an injection molding method, an extrusion molding method, a blow molding method, or a calender molding method.

The aromatic polycarbonate resin composition of the invention is capable of inhibiting the generation of outgas particularly when the molding is performed under a high temperature of 300° C. or more, and a superior molded article having both heat resistance and impact resistance can be obtained therefrom.

The molded article of the first invention group of the invention has superior impact resistance, flame retardance, color rendering properties, and therefore can be widely industrially applied as various materials in, for instance, the automotive field, the OA machine field, home appliances, and the electrical and electronics field.

Examples of the method for molding the curable resin composition of the second invention group of the invention include transfer molding, sheet molding compound molding, and bulk molding compound molding. Moreover, in a case that the curable resin composition is in a solution state, the curable resin composition can also be used as an adhesive for coating.

The application of the molded article of the second invention group of the invention is not particularly limited, and the molded article can be widely industrially applied as a material in the automotive field, the OA machine field, and the electrical and electronics field.

EXAMPLES

In the following, the invention is specifically described with examples and comparative examples. Examples 1 to 14 and Comparative Examples 1 to 13 relate to the 1$^{st}$ invention group, and Examples 21 to 46 and Comparative Examples 21 to 25 relate to the 2$^{nd}$ invention group. Examples 1 to 5 and Comparative Examples 1 to 4 relate to a polyorganosiloxane-containing graft copolymer, and Examples 6 to 14 and Comparative Examples 5 to 13 relate to a polycarbonate-based resin composition. Examples 21 to 33 and Comparative Examples 21 and 22 relate to a powder containing a polyorganosiloxane-containing graft copolymer. Examples 34 to 46 and Comparative Examples 23 to 25 relate to a polycarbonate-based resin composition.

Before the examples, the various evaluation methods, Production Examples 1 and 2 of the latex of the polyorganosiloxane rubber, and Production Example 3 of the powder containing polytetrafluoroethylene are described. In the following, "parts" and "%" mean "mass parts" and "mass %," respectively, unless otherwise stated.

<1. Evaluation Methods>

1) Solid Content of Latex

The latex having a mass $w_i$ was dried at 180° C. in a hot air drying machine for 30 min, the mass $w_2$ of the residue after drying was measured, and the solid content was calculated using the following equation.

$$\text{Solid content } (\%) = w_2/w_1 \times 100 \quad (1)$$

2) Rate of Polymerization

The rate of polymerization was calculated using the following equation according to the mass $w_3$ of all of the monomers being used when the polymer was produced and the mass $w_4$ of the solid obtained after the polymerization.

$$\text{Rate of polymerization } (\%) = w_4/w_3 \times 100 \quad (2)$$

3) Volume Average Particle Diameter of Graft Copolymer

The evaluation related to the evaluation of the first invention group. The latex of the graft copolymer was diluted by distilled water, and the volume average median particle diameter was calculated using a laser diffraction scattering particle size distribution meter (SALD-7100 made by Shimadzu). The sample concentration of the latex was suitably adjusted to be within a suitable range for a scattered light intensity monitor attached to the apparatus. The standard particle matter adopts monodispersed polystyrene of which the particle diameter was known, and 12 kinds of particles having particle diameters within the range of 20 to 800 nm were used.

4) Particle diameter of graft copolymer measured with absorptiometry

The evaluation relates to the evaluation of the second invention group. The concentration (solid content) of the latex of the graft copolymer was diluted to a liquid of 0.5 g/L by deionized water, and the absorbance under a wavelength of 700 nm was measured using a UV-visible spectrophotometer (UV-mini1240 made by Shimadzu). The particle diameter was calculated using the following equation.

$$\text{Particle diameter (nm)} = 1000 \times 10^{0.4379 \times \log(DA) - 0.4160} \quad (3)$$

5) Metal Content and Sulfur Content in Powder

The evaluation relates to the evaluation of the second invention group. First, 0.25 g of the powder containing the graft copolymer was measured in a decomposition vessel, and 8 ml of nitric acid was added to decompose the powder by microwave (wet decomposition). After cooling, 2 ml of hydrofluoric acid was added and the microwave treatment was performed again, and the resultant was diluted to 50 ml by distilled water to serve as a test solution. To the test solution, an inductively coupled plasma (ICP) emission spectrometer (IRIS Interpid II XSP, made by Thermo Scientific) was used to quantify the contents of potassium, sodium, calcium, magnesium, and sulfur.

6) Charpy Impact Strength

According to JIS K 7111-1/1eA, the Charpy impact strength of a test piece (length: 80.0 mm, width: 10.0 mm, thickness: 4 mm, provided with a V-shaped notch) was measured at the temperatures of 23° C. and −30° C., respectively.

7) Total Light Transmittance (Color Rendering Properties)

The evaluation relates to the evaluation of the first invention group. According to JIS K 7375, the total light transmittance of a test piece (length: 100 mm, width: 50 mm, thickness: 2 mm) of a D65 light source was measured using a hazemeter NDH4000 made by Nippon Denshoku Industries Co., Ltd.

8) Flame Retardance

The evaluation relates to the evaluation of the first invention group. The thermoplastic resin composition was molded into a ¹/₁₆-inch fuel rod, and a UL-94V test was performed.

9) Thermal Aging Resistance

The evaluation relates to the evaluation of the first invention group. A heat treatment was performed on a test piece (length: 80.0 mm, width: 10.0 mm, thickness: 4 mm, provided with a V-shaped notch) at 120° C. in an oven for 12 hours. The test piece was removed from the oven, and after the test piece was placed under an environment of a temperature of 23° C. and a relative humidity of 50% for 24 hours or more, the Charpy impact strength was measured at 23° C. as the indication of thermal aging resistance.

10) Thermal Decomposition Resistance

The evaluation relates to the evaluation of the second invention group. First, a particle was produced according to the above production condition 11. Then, the particle was provided to a Sumitomo SE100DU injection molding machine (made by Sumitomo Heavy Industries, Ltd.) and a mold having a hot runner (test piece dimension: longitude 100 mm×transverse 100 mm×thickness 2 mm, pin gate), and injection molding was performed under the conditions of a material cylinder temperature of 310° C., a runner temperature of 310° C., and a mold temperature of 90° C. After the first-shot molding, injection molding was continuously performed 3 times with the retention time between two shots being 2 minutes, so as to obtain a test piece without retention (0 min), a test piece after a 2-min retention, a test piece after a 4-min retention, and a test piece after a 6-min retention.

For the 4 test pieces, the number of silver streaks of the molded products were confirmed visually according to the above evaluation condition 12 (thermal decomposition resistance) as the indication of thermal decomposition resistance. A greater amount of outgas generated means a greater number of silver streaks, which means lower thermal decomposition resistance.

++: best (0),
+: good (1 to 2),
−: poor (3 to 10),
−−: worst (10 or more).

(11) Chemical Resistance

The evaluation relates to the evaluation of the second invention group. Injection molding was performed on the resin composition using a 100 ton injection molding machine (SE-100DU made by Sumitomo Heavy Industries, Ltd.) under the conditions of a cylinder temperature of 310° C. and a mold temperature of 90° C. to obtain a test piece of 100 mm long, 50 mm wide and 2 mm thick. After a test piece was dipped in a solvent (a mixture of 13 mass % of acetone, 20 mass % of toluene, 16 mass % of 4-hydroxyl-4-methyl-2-pentanone, 16 mass % of isobutanol, 20 mass % of methyl ethyl ketone, 5 mass % of xylene, and 10 mass % of cyclohexanone) for 2 min under room temperature (25° C.), the test piece was dried at 70° C. for 30 min. After the test piece was left still in air at a temperature of 23° C. and a relative humidity of 50% for 4 hours, a surface impact test was performed using a DuPont surface impact test machine (load of 1 kg, height of 10 cm, n=10). The brittle fracture rate was calculated using the equation below as the indication of chemical resistance. A lower brittle fracture rate means higher chemical resistance.

Brittle fracture rate (%)=(number of test pieces brittle fractured)/(total number of test pieces)×100    Equation (4)

12) L* (Color Rendering Properties)

The evaluation relates to the evaluation of the second invention group. L* of a test piece was measured under the above evaluation condition 13 (color rendering properties).

PRODUCTION EXAMPLES

Production Example 1

2 parts of tetraethoxysilane (TEOS), 2 parts of γ-methacryloyloxypropyl dimethoxy methyl silane (DSMA), and 96 parts of octamethylcyclotetrasiloxane (trade name: TSF404, produced by Momentive Performance Materials Inc.) were mixed to obtain 100 parts of an organosiloxane mixture. An aqueous solution formed by dissolving 1 part of sodium dodecylbenzenesulfonate (DBSNa) in 150 parts of deionized water was added in the mixture, and after being stirred by a homomixer under 10,000 rpm for 5 min, the mixture was passed through a homogenizer twice under a pressure of 20 MPa to obtain a stable pre-mixed emulsion.

Then, the above emulsion was added in a separable flask having a volume of 5 L and having a cooling condenser. The emulsion was heated to 80° C., and then a mixture of 0.20 parts of sulfuric acid and 49.8 parts of distilled water was continuously added in 3 min. After the state that the mixture was heated to 80° C. was kept for 7 hours to perform a polymerization reaction, the mixture was cooled to room temperature (25° C.), and the obtained reaction solution was kept under room temperature for 6 hours. Then, a 5% aqueous solution of sodium hydroxide was added to neutralize the reaction solution to a pH of 7.0 to obtain a latex (S-1) of polyorganosiloxane rubber.

The solid content of the latex is 29.8%, the arithmetic average particle diameter (Dn) of the same as measured by a capillary particle size distribution meter (CHDF2000, made by Martek) is 384 nm, the mass average particle diameter (Dw) of the same is 403 nm, and Dw/Dn is 1.05.

Production Example 2

97.5 parts of a cyclic organosiloxane mixture (trade name: DMC, produced by Shin-Etsu Chemical Co., Ltd.), 2 parts of TEOS, and 0.5 parts of DSMA were mixed to obtain 100 parts of an organosiloxane mixture. An aqueous obtained by dissolving 0.68 parts of DBSNa and 0.68 parts of dodecylbenzenesulfonic acid (DBSH) in 200 parts of deionized water was added in the mixture, and after being stirred by a homomixer at 10,000 rpm for 2 min, the mixture was passed through a homogenizer twice under a pressure of 20 MPa to obtain a stable pre-mixed emulsion.

Then, the above emulsion was added in a separable flask having a volume of 5 L and having a cooling condenser. After the emulsion was heated to 85° C. and maintained at the temperature for 6 hours to perform a polymerization reaction, the emulsion was cooled to room temperature (25° C.), and the obtained reactant was maintained under room temperature for 12 hours. Then, a 5% aqueous solution of sodium hydroxide was added to neutralize the reaction solution to a pH of 7.0 to obtain a latex (S-2) of polyorganosiloxane rubber.

The solid content of the latex is 28.3%. Moreover, Dn of the latex is 86 nm, Dw of the same is 254 nm, and Dw/Dn is 2.95.

Production Example 3

Production Example 3 related to a powder (J-2) containing polytetrafluoroethylene. In the following, "PTFE" means polytetrafluoroethylene.

6.0 parts of dipotassium alkenylsuccinate as an emulsifier and 230 parts of distilled water were placed in a separable flask having a volume of 2 L and having a stirring wing, a condenser, a thermocouple and a nitrogen inlet, and the mixture was stirred under room temperature for 30 min in a stream of $N_2$ gas. Moreover, the dipotassium alkenylsuccinate is previously dissolved in a portion of the distilled water for use.

Then, the temperature of the liquid in the flask was raised to 70° C., and an aqueous solution obtained by dissolving 0.2 part of potassium persulfate in 3 parts of distilled water was added in the flask. A mixture containing 50 parts of methyl methacrylate (MMA), 30 parts of styrene (St), 20 parts of n-butyl acrylate (n-BA), and 0.1 part of n-octyl mercaptan was further added dropwise in the flask in 4 hours to perform radical polymerization. After the dropwise addition, the temperature of the liquid in the flask was maintained at 70° C. while stirring was performed for 1 hour to obtain a latex (p2-1) of a vinyl polymer (p2). The content of the vinyl polymer (p2) in the latex is 30%.

166.7 parts of the latex (p2-1), and 83.3 parts of "Fluon AD939E" (made by Asahi Glass Co., Ltd., concentration of PTFE: 60%, mass average molecular weight of PTFE: about 15 million, concentration of polyoxyalkylene alkyl ether: 3%) as a latex containing a PTFE-based polymer (p1) were added in a reactor having a volume of 5 L and having a stirring apparatus, and stirring was performed for 5 hours to obtain a latex (j-2). The latex contains 50 parts of PTFE, 2.5 parts of polyoxyalkylene alkyl ether, and 50 parts of the vinyl polymer (p2).

Then, 325 parts of an aqueous solution containing 5.0 parts of calcium acetate as a condensation agent was placed in a flask having a volume of 10 L. The aqueous solution was heated to 80° C., and the latex (j-2) was slowly added dropwise therein under stirring such that the polymer was condensated to obtain a slurry. After the temperature of the slurry was raised to 90° C., stirring was continued for 5 min. Then, the precipitate was separated from the slurry, filtered, washed with water, and dried to obtain 100 parts of a powder (J-2) containing polytetrafluoroethylene.

Example 1

29.5 parts (in polymer equivalent) of the latex (S-1) of polyorganosiloxane rubber obtained in Production Example 1 was placed in a separable flask having a volume of 5 L, and then 100 parts of deionized water was added to mix. Then, a mixture of 58.9 parts of n-butyl acrylate (n-BA), 1.8 parts of allyl methacrylate (AMA), and 0.25 parts of t-butyl hydroperoxide (t-BH) was added in the separable flask.

Nitrogen substitution was performed in the separable flask by streaming nitrogen gas in the flask, and the liquid temperature was raised to 50° C. An aqueous solution obtained by dissolving 0.001 part of ferrous sulfate (Fe), 0.003 part of ethylenediaminetetraacetic disodium salt (EDTA) and 0.3 part of sodium formaldehydesulfoxylate (SFS) in 2.5 parts of deionized water was added when the liquid temperature was 50° C. to begin radical polymerization. In order to complete the polymerization of the acrylate component, the state of a liquid temperature of 65° C. was maintained for 1 hour to obtain a latex of a composite rubber of polyorganosiloxane and poly(n-butylacrylate).

Under the state that the temperature of the latex of the above composite rubber was maintained at 65° C., a mixture of 4.9 parts of St, 4.7 parts of MMA, 0.2 part of n-BA and 0.03 part of t-BH was added dropwise in the latex in 1.5 hours to perform polymerization. After the dropwise addition and after the liquid temperature was kept at 65° C. for 1 hour, the mixture was cooled to 25° C. to obtain a latex of the polyorganosiloxane-containing graft copolymer (G-1). The volume average particle diameter of the graft copolymer (G-1) is shown in Table 1.

Then, 500 parts of an aqueous solution in which the concentration of calcium acetate was 1 mass % was maintained at 30° C., and 300 parts of the latex of the graft copolymer (G-1) was slowly added dropwise therein under stirring for coagulation. Filtration and dehydration were performed on the obtained graft copolymer (G-1). After water 10 times the amount of 100 parts of the graft copolymer was further added, washing was performed in a flask provided with a stirrer for 10 min, and then filtration and dehydration were performed. After the operation was repeatedly performed twice, the mixture was dried to obtain a powder of the graft copolymer (G-1). The proportion of polymerization and the volume average particle diameter of the graft copolymer (G-1) are shown in Table 1. Moreover, the proportion of polymerization is the proportion of polymerization of the monomer component used in all steps from the production of the composite rubber to the graft polymerization thereof.

Examples 2 to 4, Comparative Examples 1 and 2

In Example 1, except that the types and the amounts of the raw materials used were changed to the conditions shown in Table 1, the same steps as Example 1 were performed to produce polyorganosiloxane-containing graft copolymers (G-2 to G-4, and G'-1 and G'-2) and to further obtain the powder of each of the graft copolymers. The proportion of polymerization and the volume average particle diameter of each of the obtained graft copolymers are shown in Table 1. Moreover, in Comparative Example 2, since the proportion of polymerization of G'-2 was reduced to 91%, the residual monomer was analyzed using gas chromatography. The result showed that the proportion of polymerization of St was reduced to 68%, and polymerization thereof was concluded to not occur.

Example 5

10.0 parts (in polymer equivalent) of the latex (S-1) obtained in Production Example 1 was placed in a separable flask having a volume of 5 L, and then 200 parts of distilled water was added to mix. Then, a mixture of 59.1 parts of n-BA, 0.9 parts of AMA, and 0.18 parts of t-BH was added in the separable flask.

Nitrogen substitution was performed in the separable flask by streaming nitrogen gas in the flask, and the liquid temperature was raised to 50° C. An aqueous solution obtained by dissolving 0.001 part of ferrous sulfate (Fe), 0.003 part of ethylenediaminetetraacetic disodium salt (EDTA), and 0.18 part of sodium formaldehydesulfoxylate (SFS) in 10 parts of distilled water was added when the liquid temperature was 50° C. to begin radical polymerization. To complete the polymerization of the acrylate component, the state of a liquid temperature of 65° C. was maintained for 1 hour to obtain a latex of the composite rubber of polyorganosiloxane and poly(n-butylacrylate).

Under a state that the temperature of the latex of the above composite rubber was maintained at 65° C., a mixture of 15 parts of MMA, 15 parts of St, and 0.14 part of t-BH was added dropwise in the flask in 1 hour to perform polymerization. After the dropwise addition and after the state of a liquid temperature of 65° C. was maintained for 1 hour, the mixture was cooled to room temperature (25° C.) to obtain a latex of a polyorganosiloxane-containing graft copolymer (G-5). The proportion of polymerization and the volume average particle diameter of the graft copolymer (G-5) are shown in Table 1.

Then, 500 parts of an aqueous solution in which the concentration of calcium acetate was 1 mass % was heated to 60° C., and 340 parts of the latex of the graft copolymer (G-5) was slowly added dropwise in the liquid under stirring to perform coagulation. Filtration and dehydration were performed on the obtained graft copolymer (G-5). After water 10 times the amount of 100 parts of the graft copolymer was further added, washing was performed in a flask provided with a stirrer for 10 min, and then filtration and dehydration were performed. After the operation was repeatedly performed twice, the mixture was dried to obtain a powder of the graft copolymer (G-5).

Comparative Example 3

80.0 parts (in polymer equivalent) of the latex (S-1) obtained in Production Example 1 was placed in a separable flask having a volume of 5 L, and then 46 parts of distilled water was added to mix. Then, a mixture of 5.0 parts of AMA and 0.11 part of cumene hydroperoxide (CHP) was added in the separable flask.

Nitrogen substitution was performed in the separable flask by streaming nitrogen gas in the flask, and the liquid temperature was raised to 60° C. An aqueous solution obtained by dissolving 0.001 part of ferrous sulfate (Fe), 0.003 part of ethylenediaminetetraacetic disodium salt (EDTA), and 0.18 part of sodium formaldehydesulfoxylate (SFS) in 2.5 parts of deionized water was added when the liquid temperature was 60° C. to begin radical polymerization, and the radical polymerization was maintained under a liquid temperature of 70° C. for 1 hour.

In the latex having a liquid temperature of 70° C., a mixture of 15.0 parts of phenyl methacrylate (PhMA) and 0.3 part of t-BH was added dropwise in 1.5 hour for polymerization. After the dropwise addition and after the state of a liquid temperature of 70° C. was maintained for 1 hour, the mixture was cooled to 23° C. to obtain a latex of a polyorganosiloxane-containing graft copolymer (G'-3). The proportion of polymerization and the volume average particle diameter of the graft copolymer (G'-3) are shown in Table 1.

Then, except that the graft copolymer (G'-3) was used, the same steps as Example 1 were performed to obtain a powder of the graft copolymer (G'-3).

Comparative Example 4

20.0 parts (in polymer equivalent) of the latex (S-2) obtained in Production Example 2 was placed in a separable flask having a volume of 5 L, and then 140 parts of distilled water was added to mix. Then, a mixture of 49.0 parts of n-BA, 1.0 part of AMA, and 0.20 part of t-BH was added in the separable flask. Then, the same steps as Example 1 were performed to obtain a latex of the composite rubber.

Under a state that the temperature of the above composite rubber latex was maintained at 65° C., a mixture of 6.0 parts of MMA, 24.0 parts of St, and 0.12 part of t-BH was added dropwise in 1 hour to perform polymerization. After the dropwise addition and after the state of a liquid temperature of 65° C. was kept for 1 hour, the mixture was cooled to room temperature (25° C.) to obtain a latex of the graft copolymer (G'-4). The proportion of polymerization and the volume average particle diameter of the graft copolymer (G'-4) are shown in Table 1.

Then, except that the graft copolymer (G'-4) was used, the same steps as Example 1 were performed to obtain a powder of the graft copolymer (G'-4).

Examples 6 to 11, Comparative Examples 5 to 10

The powder of each of the polyorganosiloxane-containing graft copolymers (G-1 to G-5 and G'-1 to G'-4) obtained in Examples 1 to 5 and Comparative Examples 1 to 4 was used as the polyorganosiloxane-containing graft copolymer, and a test piece 1 for evaluation of the impact resistance, a test piece 2 for evaluation of the total light transmittance, and a test piece 3 for evaluation of the flame retardance were respectively produced according to the above production condition 1. Moreover, after being dried at 80° C. for 12 hours, the pellets were provided to an injection molding machine. Then, each of the evaluations was performed according to the above evaluation condition 2 to obtain the evaluations results shown in Table 2.

Examples 12 to 14, Comparative Examples 11 to 13

The powder of each of the polyorganosiloxane-containing graft copolymers (G-1 and G'-4) obtained in Example 1 or Comparative Example 4, an organic sulfonic acid metal salt (trade name: Megafac F-114, by DIC Corporation), the powder J-2 containing polytetrafluoroethylene obtained in Production Example 3 as a drip inhibitor, a polycarbonate resin (trade name: Iupilon S-2000F, from Mitsubishi Engineering Plastics Co., Ltd., viscosity average molecular weight: 22,000), a phenol-based antioxidant (trade name: Irganox 245, made by Ciba Japan K.K.), and a phosphorus-based antioxidant (trade name: Adekastab PEP36, by ADEKA Corp.) were mixed in the amounts recited in Table 3. Besides, the same steps as Example 6 were performed to obtain the polycarbonate-based resin compositions and the respective test pieces. The evaluation results are shown in Table 3.

[Comparison of Performance of Resin Compositions]

It is clear that, in comparison to the resin composition of Comparative Example 5, the balance between the flame retardance, the impact resistance and the total light transmittance of the resin composition of Example 6 containing 3.3 parts of the polyorganosiloxane-containing graft copolymer was superior. It is also clear that, in comparison to the resin compositions of Comparative Examples 6 to 9, the balance between the flame retardance, the impact resistance and the total light transmittance of the resin compositions of Examples 7 to 11 containing 5.5 parts of the polyorganosiloxane-containing graft copolymer was superior.

Since the volume average particle diameter of the graft copolymer (G'-4) used in the resin compositions of Comparative Examples 5 and 9 is less than 200 nm, the flame retardance and the impact resistance (at low temperature and 23° C. after thermal aging test) are substandard. Since the graft copolymer (G'-1) used in the resin composition of Comparative Example 6 did not contain the aromatic vinyl monomer ($b_2$), the flame retardance was substandard.

Since the graft copolymer (G'-2) used in the resin composition of Comparative Example 7 did not contain the (meth)acrylate ester ($b1$), its compatibility with a matrix resin was substandard, and in comparison to Examples 7 to 10 of the graft copolymers (G-1 to G-4) having the same content of the polyorganosiloxane and the same content of the composite rubber, the low-temperature impact resistance is substandard.

The resin composition of Comparative Example 8 contained the graft copolymer (G'-3) containing more than 69 mass % of polyorganosiloxane but not containing the aromatic vinyl monomer ($b_2$). Therefore, the graft copolymer had a low refractive index and the difference between the low refractive index and the refractive index of the matrix resin became greater, so the total light transmittance of the resin composition was substandard, and the color rendering properties thereof were substandard. The resin composition of Comparative Example 10 does not contain the graft copolymer (B), so the impact resistance thereof was substandard, and the flame retardance thereof was also relatively substandard.

It is clear that, in a case that an organic metal salt was used in the flame retardant, in comparison to the resin composition of Comparative Example 11, the balance between the flame retardance, the impact resistance and the total light transmittance of the resin compositions of Examples 12 and 13 was superior. It is also clear that the balance between the flame retardance, the impact resistance and the total light transmittance of the resin composition of Example 14 was superior in comparison to the resin compositions of Comparative Examples 12 and 13.

Since the volume average particle diameter of the graft copolymer (G'-4) used in the resin composition of Comparative Example 12 was less than 200 nm, the flame retardance and the low temperature impact resistance were substandard. Moreover, because the resin compositions of Comparative Examples 11 and 13 did not contain the graft copolymer (B), the impact resistance was substandard even though the flame retardance or color rendering properties were superior.

TABLE 1

| | | | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|---|
| Graft copolymer (B) | | | | G-1 | G-2 | G-3 | G-4 | G-5 | G'-1 | G'-2 | G'-3 | G'-4 |
| Polyorganosiloxane (solid) | S-1 | | part | 29.5 | 29.5 | 29.5 | 29.5 | 10 | 29.5 | 29.5 | 80 | — |
| | S-2 | | part | — | — | — | — | — | — | — | — | 20 |
| Monomer for composite rubber | n-BA | | part | 58.9 | 58.9 | 58.9 | 58.9 | 59.1 | 58.9 | 58.9 | — | 49 |
| | AMA | | part | 1.8 | 1.8 | 1.8 | 1.8 | 0.9 | 1.8 | 1.8 | 5 | 1 |
| Monomer for grafting | (meth)acrylate ester ($b_1$) | MMA | part | 4.7 | — | 2.8 | — | 15 | 9.3 | — | — | 6 |
| | | PhMA | part | — | 4.7 | — | 9.3 | — | — | — | 15 | — |
| | Aromatic vinyl monomer ($b_2$) | St | part | 4.9 | 4.9 | 6.8 | 0.5 | 15 | — | 9.8 | — | 24 |
| | Other monomers ($b_3$) | n-BA | part | 0.2 | 0.2 | 0.2 | — | — | 0.5 | — | — | — |
| Proportion of polymerization | | | % | 97 | 98 | 95 | 98 | 99 | 99 | 91 | 97 | 98 |
| Volume average particle diameter | | | nm | 600 | 600 | 600 | 540 | 670 | 570 | 600 | 430 | 190 | n-BA: n-butyl acrylate;
AMA: allyl methacrylate;
MMA: methyl methacrylate;
PhMA: phenyl methacrylate;
St: styrene

TABLE 2

| | | | Example 6 | Comparative Example 5 | Example 7 | Example 8 | Example 9 | Example 10 | Example 11 |
|---|---|---|---|---|---|---|---|---|---|
| PC resin (A) | S-2000F | part | 100 | 100 | 100 | 100 | 100 | 100 | 100 |
| Graft copolymer (B) | | type | G-1 | G'-4 | G-1 | G-2 | G-3 | G-4 | G-5 |
| | | part | 3.3 | 3.3 | 5.5 | 5.5 | 5.5 | 5.5 | 5.5 |
| Fluorine resin (C) | J-1 | part | 0.5 | 0.5 | 0.5 | 0.5 | 0.5 | 0.5 | 0.5 |
| Flame retardant (D) | PX-200 | part | 5.5 | 5.5 | 5.5 | 5.5 | 5.5 | 5.5 | 5.5 |
| Flame retardance | Total burn time | second | 13 | 230 | 28 | 27 | 61 | 78 | 64 |
| | Maximum burn time of 1 streak | second | 2 | 71 | 8 | 9 | 17 | 25 | 17 |
| | Determination | — | V0 | Failure | V0 | V0 | V1 | V1 | V1 |
| Impact strength | Initial (23° C.) | kJ/m$^2$ | 65 | 66 | 63 | 59 | 60 | 56 | 64 |
| | Post thermal aging test (23° C.) | kJ/m$^2$ | 18 | 8 | 52 | 53 | 52 | 57 | 53 |
| | −30° C. | kJ/m$^2$ | 19 | 11 | 30 | 29 | 29 | 28 | 19 |
| Total light transmittance | | % | 29.4 | 36.3 | 26.1 | 24.1 | 26.0 | 26.1 | 31.4 |
| S + T × 1.36 | | — | 58.984 | — | 60.368 | 65.496 | 61.776 | 64.36 | 63.496 | 61.704 |

| | | | Comparative Example 6 | Comparative Example 7 | Comparative Example 8 | Comparative EExample 9 | Comparative Example 10 |
|---|---|---|---|---|---|---|---|
| PC resin (A) | S-2000F | part | 100 | 100 | 100 | 100 | 100 |
| Graft copolymer (B) | | type | G'-1 | G'-2 | G'-3 | G'-4 | — |
| | | part | 5.5 | 5.5 | 5.5 | 5.5 | — |
| Fluorine resin (C) | J-1 | part | 0.5 | 0.5 | 0.5 | 0.5 | 0.5 |
| Flame retardant (D) | PX-200 | part | 5.5 | 5.5 | 5.5 | 5.5 | 5.5 |

TABLE 2-continued

| Flame retardance | Total burn time | second | 123 | 27 | 30 | 108 | 123 |
|---|---|---|---|---|---|---|---|
| | Maximum burn time of 1 streak | second | 50 | 9 | 9 | 36 | 20 |
| | Determination | — | Failure | V0 | V0 | Failure | V2 |
| Impact strength | Initial (23° C.) | kJ/m$^2$ | 53 | 62 | 55 | 62 | 8 |
| | Post thermal aging test (23° C.) | kJ/m$^2$ | 55 | 52 | 51 | 9 | 5 |
| | −30° C. | kJ/m$^2$ | 27 | 24 | 25 | 14 | 8 |
| Total light transmittance | | % | 24.6 | 26.0 | 18.0 | 28.1 | 69.8 |
| S + T × 1.36 | | — | 60.456 | 59.4 | 49.48 | 52.216 | 102.928 |

S: impact strength below −30° C.;
T: total light transmittance

TABLE 3

| | | | Example 12 | Example 13 | Comparative Example 11 | Example 14 | Comparative Example 12 | Comparative Example 13 |
|---|---|---|---|---|---|---|---|---|
| PC resin (A) | S-2000F | part | 100 | 100 | 100 | 100 | 100 | 100 |
| Graft copolymer (B) | | type | G-1 | G-1 | — | G-1 | G'-4 | — |
| | | part | 1 | 3 | — | 5 | 5 | — |
| Fluorine resin (C) | J-2 | part | 0.8 | 0.8 | 0.8 | 1 | 1 | 1 |
| Flame retardant (D) | F-114 | part | 0.1 | 0.1 | 0.1 | 0.05 | 0.05 | 0.05 |
| Antioxidant (E) | Irganox 245 | part | 0.1 | 0.1 | 0.1 | 0.1 | 0.1 | 0.1 |
| | PEP36 | part | 0.1 | 0.1 | 0.1 | 0.1 | 0.1 | 0.1 |
| Flame retardance | Total burn time | second | 33 | 66 | 8 | 64 | 125 | 28 |
| | Maximum burn time of 1 streak | second | 8 | 20 | 2 | 15 | 49 | 12 |
| | Determination | — | V0 | V1 | V0 | V1 | Failure | V1 |
| Impact strength | Initial (23° C.) | kJ/m$^2$ | 78 | 68 | 78 | 59 | 64 | 21 |
| | Post thermal aging test (23° C.) | kJ/m$^2$ | 14 | 63 | 8 | 64 | 67 | 8 |
| | −30° C. | kJ/m$^2$ | 22 | 28 | 15 | 36 | 17 | 13 |
| Total light transmittance | | % | 45.2 | 31.5 | 65.6 | 26.2 | 27.7 | 61.4 |
| S + T × 1.36 | | — | 83.472 | 70.84 | 104.216 | 71.632 | 54.672 | 96.504 |

S: impact strength at −30° C.;
T: total light transmittance

The following are examples of the second invention group.

Example 21

33.56 parts (10.0 parts in polymer equivalent) of the latex (S-1) of the polyorganosiloxane rubber obtained in Production Example 1 was placed in a separable flask having a volume of 5 L, and then 200 parts of distilled water was added to mix. Then, a mixture of 59.1 parts of n-butyl acrylate (n-BA), 0.9 part of allyl methacrylate (AMA), and 0.24 part of t-butyl hydroperoxide (t-BH) was added in the separable flask.

Nitrogen substitution was performed in the separable flask by streaming nitrogen gas in the flask, and the liquid temperature was raised to 50° C. An aqueous solution obtained by dissolving 0.001 part of ferrous sulfate (Fe), 0.003 part of ethylenediaminetetraacetic disodium salt (EDTA), and 0.18 part of sodium formaldehydesulfoxylate (SFS) in 10 parts of distilled water was added when the liquid temperature was 50° C. to begin radical polymerization. After the liquid temperature was reduced to 65° C., in order to complete the polymerization of the acrylate component, the state of a liquid temperature of 65° C. was maintained for 1 hour to obtain a latex of the composite rubber of polyorganosiloxane and poly(n-butylacrylate).

Under a state in which the liquid temperature of the latex of the composite rubber was maintained at 65° C., a mixture of 28.5 parts of methyl methacrylate (MMA), 1.5 part of n-BA, and 0.14 part of t-BH was added dropwise in the latex in 1 hour to perform polymerization. After the dropwise addition and after the state of a liquid temperature of 60° C. or more was maintained for 1 hour, the mixture was cooled to 25° C. to obtain a latex of the polyorganosiloxane-containing graft copolymer (G-21). The particle diameter of the graft copolymer measured with absorptiometry is 405 nm.

Then, 500 parts of an aqueous solution in which the concentration of calcium acetate was 1 mass % was heated to 60° C., and 340 parts of the latex of the graft copolymer (G-21) was slowly added dropwise in the aqueous solution under stirring for coagulation. Filtration and dehydration were performed on the obtained graft copolymer (G-21). After water 10 times the amount of 100 parts of the graft copolymer was further added, washing was performed in a flask provided with a stirrer for 10 min, and then filtration and dehydration were performed. After the operation was repeatedly performed twice, the mixture was dried to obtain a powder of the graft copolymer (G-21). The alkali metal content, the alkaline earth metal content and the sulfur content of the obtained powder are shown in Table 5. Moreover, the particle diameter of each of the graft copolymers is shown in Table 5.

Examples 22 to 26 and 33, Comparative Examples 21 and 22

In Example 21, except that the types and the amounts of the raw materials used were changed to the conditions shown in Table 4, the same steps as Example 21 were performed to produce the powder of each of the polyorganosiloxane-containing graft copolymers (G-22 to G-26 and G-33, and G'-21 and G'-22). Each of the evaluation results is shown in Table 5.

Example 27

33.56 parts (10.0 parts in polymer equivalent) of the latex (S-1) obtained in Production Example 1 was placed in a separable flask having a volume of 5 L, and then 200 parts of distilled water was added to mix. Then, a mixture of 59.1 parts of n-BA and 0.9 part of AMA was added in the separable flask.

Nitrogen substitution was performed in the separable flask by streaming nitrogen gas in the flask, and the liquid temperature was raised to 50° C. An aqueous solution obtained by dissolving 0.15 part of 2,2'-azobis[N-(2-carboxymethyl)-2-methylpropionamidine]hydrate (trade name: VA-057, by Wako Pure Chemical Industries, Ltd.) in 10 parts of distilled water was added when the liquid temperature was 50° C. to begin radical polymerization. After the liquid temperature was reduced to 65° C., in order to complete the polymerization of the acrylate component, the state of a liquid temperature of 65° C. was maintained for 1 hour to obtain a latex of the composite rubber of polyorganosiloxane and poly(n-butylacrylate).

Under a state that the liquid temperature of the latex of the above composite rubber was maintained at 65° C., an aqueous solution obtained by dissolving 0.001 part of Fe, 0.003 part of EDTA, and 0.12 part of SFS in 10 parts of distilled water was added in the flask. Then, a mixture of 28.5 parts of MMA, 1.5 part of n-BA, and 0.14 part of t-BH was added dropwise to the flask in 1 hour to perform polymerization. After the dropwise addition and after the state of a liquid temperature of 60° C. or more was maintained for 1 hour, the mixture was cooled to room temperature (25° C.) to obtain a latex of the polyorganosiloxane-containing graft copolymer (G-27). The particle diameter obtained from the absorbance of the graft copolymer is 415 nm.

Then, 500 parts of an aqueous solution in which the concentration of calcium acetate was 1 mass % was heated to 60° C., and 340 parts of the latex of the graft copolymer (G-27) was slowly added dropwise in the aqueous solution under stirring for coagulation. Filtration and dehydration were performed on the obtained graft copolymer (G-27). After water 10 times the amount of 100 parts of the graft copolymer was further added, washing was performed in a flask provided with a stirrer for 10 min, and then filtration and dehydration were performed. After the operation was repeatedly performed twice, the mixture was dried to obtain a powder of the graft copolymer (G-27). Each of the evaluation results is shown in Table 5.

Examples 28 to 32

In Example 27, except that the types and the amounts of the raw materials used were changed to the conditions shown in Table 4, the same steps as Example 27 were performed to produce the powder of each of the polyorganosiloxane-containing graft copolymers (G-28 to G-32). Each of the evaluation results is shown in Table 5.

[Comparison of Powders of Graft Copolymers]

Since the amount of SFS as a polymerization initiator in the production of the composite rubber was less than 0.2 part in the powder of each of the graft copolymers of Examples 21 to 33, even in a case that coagulation was performed using calcium acetate, the alkaline earth metal content was still 150 ppm or less.

Since the amount of SFS as a polymerization initiator in the production of the composite rubber was more than 0.2 part in the powder of the graft copolymer of Comparative Example 21, in a case that coagulation was performed using calcium acetate, the alkaline earth metal content was more than 150 ppm.

Since the particle diameter of the polyorganosiloxane rubber was small, the particle diameter of the powder of the graft copolymer of Comparative Example 22 was 300 nm or less.

Examples 34 to 46, Comparative Examples 23 to 25

The powder of each of the graft copolymer (G-21 to G-33, G'-21, G'-22) was used as a polyorganosiloxane-containing graft copolymer. The thermal decomposition resistance and the color rendering properties were respectively evaluated based on the aforementioned production condition 11 for resin compositions/test pieces, evaluation condition 12 (thermal decomposition resistance) and evaluation condition 13 (color rendering properties). After the particles were dried under 80° C. for 12 hours, the particles were provided to an injection molding machine.

Moreover, the particles for which drying was similarly performed under 80° C. for 12 hours were provided to a 100 ton injection molding machine (trade name: SE-100DU, made by Sumitomo Heavy Industries, Ltd.), and injection molding was made at a cylinder temperature of 310° C. and a mold temperature of 90° C. Based on JIS K7152, a test piece (length: 80.0 mm, width: 10.0 mm, thickness: 4 mm, provided with V-shaped notch) for evaluation of the Charpy impact strength, a test piece (longitude: 100 mm, transverse: 100 mm, thickness: 2 mm) for evaluation of thermal decomposition resistance, and a test piece (length: 100 mm, width: 50 mm, thickness: 2 mm) for evaluation of chemical resistance were obtained using a family mold. The evaluation results are shown in Table 6.

[Comparison of Performance of Resin Compositions]

It is clear from Examples 34 to 46 that for the polycarbonate resin composition obtained using the powder of the graft copolymer having an alkali metal amount of 20 ppm or less and an alkaline earth metal amount of 150 ppm or less, generation of outgas during high-temperature molding could be inhibited, and the thermal decomposition resistance was superior.

Moreover, since the alkaline earth metal amount contained in the powder of the graft copolymer in the polycarbonate resin composition of Comparative Example 23 is 150 ppm or more, in comparison to the resin compositions of Examples 34 to 46, the generation of outgas was confirmed to a significant degree, and thermal decomposition resistance was substandard.

Since in producing the composite rubbers of the polycarbonate resin compositions of Examples 36 to 39 the peroxide used to polymerize the alkyl(meth)acrylate component was cumene hydroperoxide or diisopropylbenzene hydroperoxide, chemical resistance was superior.

Moreover, since the content of the composite rubber in the graft copolymer of each of the polycarbonate resin compositions of Examples 35, 37, 39, 41, 42 and 43 was 75 mass % or more, the chemical resistance was more superior.

Since the sp value of the graft portion of the graft copolymer of the polycarbonate resin composition of Example 44 was high, the chemical resistance was good.

Since the monomer for grafting of the polycarbonate resin composition of Example 45 contained a crosslinking monomer during the production of the graft copolymer, and the chemical resistance of the graft copolymer itself was high, the chemical resistance was good.

In the polycarbonate resin composition of Example 46, the graft portion of the graft copolymer contained a styrene unit, and the thermal decomposition resistance was good.

Since the alkaline earth metal content and the sulfur content of the powder of the graft copolymer of the polycarbonate resin composition of Comparative Example 24 were high, and since the particle diameter of the graft copolymer was less than 300 nm, the thermal decomposition resistance and the color rendering properties were substandard.

The polycarbonate resin composition of Comparative Example 25 did not contain the graft copolymer, and therefore the Charpy impact strength and the chemical resistance at a low temperature were substandard.

TABLE 4

| | | Example 21 | Example 22 | Example 23 | Example 24 | Example 25 | Example 26 | Example 27 | Example 28 |
|---|---|---|---|---|---|---|---|---|---|
| Graft copolymer | | G-21 | G-22 | G-23 | G-24 | G-25 | G-26 | G-27 | G-28 |
| Polyorganosiloxane (solid) | type | S-1 | S-1 | S-1 | S-1 | S-1 | S-1 | S-1 | S-1 |
| | part | 10 | 10 | 10 | 10 | 10 | 10 | 10 | 10 |
| Alkyl (meth)acrylate component and organic peroxide [parts] | n-BA | 59.1 | 68.9 | 59.1 | 68.9 | 59.1 | 68.9 | 59.1 | 68.9 |
| | AMA | 0.9 | 1.1 | 0.9 | 1.1 | 0.9 | 1.1 | 0.9 | 1.1 |
| | t-BH | 0.24 | 0.27 | — | — | — | — | — | — |
| | CRP | — | — | 0.33 | 0.34 | — | — | — | — |
| | DIBHP | — | — | — | — | 0.49 | 0.56 | — | — |
| Azo-based initiator for alkyl (meth)acrylate [parts] | VA-057 | — | — | — | — | — | — | 0.15 | 0.175 |
| Reducing agent, etc. [parts] | Fe | 0.001 | 0.001 | 0.001 | 0.001 | 0.001 | 0.001 | 0.001 | 0.001 |
| | EDTA | 0.003 | 0.003 | 0.003 | 0.003 | 0.003 | 0.003 | 0.003 | 0.003 |
| | SFS | 0.18 | 0.18 | 0.18 | 0.18 | 0.18 | 0.18 | 0.12 | 0.12 |
| Graft monomer component and organic peroxide [parts] | MMA | 28.5 | 19.0 | 28.5 | 19.0 | 28.5 | 19.0 | 28.5 | 19.0 |
| | n-BA | 1.5 | 1.0 | 1.5 | 1.0 | 1.5 | 1.0 | 1.5 | 1.0 |
| | St | — | — | — | — | — | — | — | — |
| | 2HEMA | — | — | — | — | — | — | — | — |
| | AMA | — | — | — | — | — | — | — | — |
| | t-BH | 0.14 | 0.14 | 0.14 | 0.14 | 0.14 | 0.14 | 0.14 | 0.09 |
| sp value [$(J/cm^3)^{0.5}$] of graft portion | | 20.13 | 20.13 | 20.13 | 20.13 | 20.13 | 20.13 | 20.13 | 20.13 |

| | | Example 29 | Example 30 | Example 31 | Example 32 | Example 33 | Comparative Example 21 | Comparative Example 22 |
|---|---|---|---|---|---|---|---|---|
| Graft copolymer | | G-29 | G-30 | G-31 | G-32 | G-33 | G'-21 | G'-22 |
| Polyorganosiloxane (solid) | type | S-1 | S-1 | S-1 | S-1 | S-1 | S-1 | S-2 |
| | part | 10 | 30 | 10 | 10 | 10 | 10 | 20 |
| Alkyl (meth)acrylate component and organic peroxide [parts] | n-BA | 78.8 | 49.0 | 59.1 | 59.1 | 59.1 | 59.1 | 59.5 |
| | AMA | 1.2 | 1.0 | 0.9 | 0.9 | 0.9 | 0.9 | 0.5 |
| | t-BH | — | — | — | — | 0.24 | 0.24 | 0.15 |
| | CRP | — | — | — | — | — | — | — |
| | DIBHP | — | — | — | — | — | — | — |
| Azo-based initiator for alkyl (meth)acrylate [parts] | VA-057 | 0.2 | 0.15 | 0.15 | 0.15 | — | — | — |
| Reducing agent, etc. [parts] | Fe | 0.001 | 0.001 | 0.001 | 0.001 | 0.001 | 0.001 | 0.0002 |
| | EDTA | 0.003 | 0.003 | 0.003 | 0.003 | 0.003 | 0.003 | 0.0006 |
| | SFS | 0.12 | 0.12 | 0.12 | 0.12 | 0.18 | 0.24 | 0.18 |
| Graft monomer component and organic peroxide [parts] | MMA | 9.5 | 19.0 | 25.65 | 27.55 | 15.0 | 28.5 | 19.0 |
| | n-BA | 0.5 | 1.0 | 1.35 | 1.45 | — | 1.5 | 1.0 |
| | St | — | — | — | — | 15.0 | — | — |
| | 2HEMA | — | — | 3.0 | — | — | — | — |
| | AMA | — | — | — | 1.0 | — | — | — |
| | t-BH | 0.05 | 0.14 | 0.14 | 0.14 | 0.14 | 0.14 | 0.08 |
| sp value [$(J/cm^3)^{0.5}$] of graft portion | | 20.13 | 20.13 | 20.61 | 20.11 | 20.13 | 20.13 | 20.13 | n-BA: n-butyl acrylate
AMA: allyl methacrylate
MMA: methyl methacrylate
St: styrene
2HEMA: 2-hydroxyethyl methacrylate
t-BH: t-butyl hydroperoxide
CHP: cumene hydroperoxide
DIBHP: diisopropylbenzene hydroperoxide
VA-057: 2,2'-azobis[N-(2-carboxymethyl)-2-methylpropionamidine]hydrate
Fe: ferrous sulfate
EDTA: ethylenediaminetetraacetic disodium salt
SFS: sodium formaldehydesulfoxylate

TABLE 5

|  |  | Example 21 | Example 22 | Example 23 | Example 24 | Example 25 | Example 26 | Example 27 | Example 28 |
|---|---|---|---|---|---|---|---|---|---|
| Graft copolymer | | G-21 | G-22 | G-23 | G-24 | G-25 | G-26 | G-27 | G-28 |
| Particle diameter | nm | 405 | 402 | 411 | 405 | 413 | 405 | 415 | 404 |
| Residual ion amount (ppm) | K | <5 | <5 | <5 | <5 | <5 | <5 | <5 | <5 |
| | Na | <2 | <2 | <2 | <2 | <2 | <2 | <2 | <2 |
| | Ca | 110 | 90 | 115 | 110 | 95 | 100 | 90 | 96 |
| | Mg | <2 | <2 | <2 | <2 | <2 | <2 | <2 | <2 |
| | S | 170 | 160 | 170 | 170 | 160 | 170 | 150 | 160 |

|  |  | Example 29 | Example 30 | Example 31 | Example 32 | Example 33 | Comparative Example 21 | Comparative Example 22 |
|---|---|---|---|---|---|---|---|---|
| Graft copolymer | | G-29 | G-30 | G-31 | G-32 | G-33 | G'-21 | G'-22 |
| Particle diameter | nm | 403 | 319 | 399 | 397 | 430 | 425 | 172 |
| Residual ion amount (ppm) | K | <5 | <5 | <5 | <5 | <5 | <5 | <5 |
| | Na | <2 | <2 | <2 | <2 | <2 | <2 | 10 |
| | Ca | 100 | 90 | 90 | 86 | 100 | 202 | 220 |
| | Mg | <2 | <2 | <2 | <2 | <2 | <2 | <2 |
| | S | 150 | 150 | 160 | 150 | 160 | 260 | 283 |

TABLE 6

|  |  | Example 34 | Example 35 | Example 36 | Example 37 | Example 38 | Example 39 | Example 40 | Example 41 | Example 42 |
|---|---|---|---|---|---|---|---|---|---|---|
| Thermoplastic resin composition | | H-34 | H-35 | H-36 | H-37 | H-38 | H-39 | H-40 | H-41 | H-42 |
| Graft copolymer | type | G-21 | G-22 | G-23 | G-24 | G-25 | G-26 | G-27 | G-28 | G-29 |
| | part | 4 | 4 | 4 | 4 | 4 | 4 | 4 | 4 | 4 |
| Polycarbonate resin (parts) | | 96 | 96 | 96 | 96 | 96 | 96 | 96 | 96 | 96 |
| Charpy impact strength | 23° C. kJ/m² | 60 | 59 | 60 | 61 | 60 | 61 | 60 | 58 | 57 |
| | −30° C. | 34 | 38 | 39 | 43 | 43 | 49 | 30 | 31 | 32 |
| Thermal decomposition resistance | 0 min | ++ | ++ | ++ | ++ | ++ | ++ | ++ | ++ | ++ |
| | 2 min | + | ++ | + | + | + | + | ++ | ++ | ++ |
| | 4 min | + | + | + | + | + | + | + | ++ | + |
| | 6 min | − | − | − | − | − | − | − | + | + |
| Chemical resistance (brittle failure rate) | % | 40 | 20 | 30 | 0 | 0 | 0 | 50 | 20 | 0 |
| Color rendering properties (L*) | | 5.4 | 5.8 | 6.1 | 6.4 | 5.8 | 6.3 | 5.1 | 5.0 | 5.7 |

|  |  | Example 43 | Example 44 | Example 45 | Example 46 | Comparative example 23 | Comparative example 24 | Comparative example 25 |
|---|---|---|---|---|---|---|---|---|
| Thermoplastic resin composition | | H-43 | H-44 | H-45 | H-46 | H'-23 | H'-24 | H'-25 |
| Graft copolymer | type | G-30 | G-31 | G-32 | G-33 | G'-21 | G'-22 | − |
| | part | 4 | 4 | 4 | 4 | 4 | 4 | − |
| Polycarbonate resin (parts) | | 96 | 96 | 96 | 96 | 96 | 96 | 100 |
| Charpy impact strength | 23° C. kJ/m² | 57 | 61 | 57 | 60 | 59 | 52 | 71 |
| | −30° C. | 32 | 31 | 31 | 37 | 31 | 64 | 17 |
| Thermal decomposition resistance | 0 min | ++ | ++ | ++ | ++ | ++ | ++ | ++ |
| | 2 min | ++ | ++ | + | ++ | + | + | ++ |
| | 4 min | + | + | ++ | ++ | − | − | ++ |
| | 6 min | − | − | ++ | ++ | −− | −− | ++ |
| Chemical resistance (brittle failure rate) | % | 0 | 40 | 30 | 40 | 50 | 0 | 100 |
| Color rendering properties (L*) | | 10.2 | 5.0 | 4.6 | 6.6 | 7.3 | 22.1 | 1.9 |

INDUSTRIAL APPLICATION

The resin compositions, especially polycarbonate resin compositions, of the first invention group and the second invention group of the invention can both be used as, for instance, materials in the automotive field, the OA machine field such as a printer, and the electronics and electric field such as a mobile phone.

The invention claimed is:

1. A polyorganosiloxane-containing graft copolymer, which is a polyorganosiloxane-containing graft copolymer (G1) formed by graft polymerizing a vinyl monomer mixture on a polyorganosiloxane-based rubber,
wherein
the vinyl monomer mixture contains a (meth)acrylate ester ($b_1$) and an aromatic vinyl monomer ($b_2$),
the (meth)acrylate ester ($b_1$) has an alkyl group or an aromatic group, a volume average particle diameter of the graft copolymer (G1) is 200 nm to 2000 nm, and
a content of the polyorganosiloxane is 0.1 mass % to 69 mass % based on 100 mass % of the graft copolymer (G1),
wherein
regarding test pieces produced under production condition 1 below, a Charpy impact strength [$kJ/m^2$], a total light transmittance [%], and a flame retardance measured under evaluation condition 2 below meet performance conditions 1) to 3):
1) 15≤Charpy impact strength≤70,
2) 60≤Charpy impact strength+total light transmittance× 1.36, and
3) the flame retardance of a thickness of 1/16 inch in a vertical flame test of UL94 standard being "V-1" or above,
wherein
the production condition 1 for the test pieces comprises:
providing a resin composition obtained by mixing
1) an aromatic polycarbonate resin having a viscosity average molecular weight of 22,000 in 100 mass parts,
2) the polyorganosiloxane-containing graft copolymer (G1) in 5.5 mass parts,
3) an acrylic acid-modified polytetrafluoroethylene in 0.5 mass part, and
4) an aromatic phosphate-based flame retardant in 5.5 mass parts
to a devolatilizing extruder heated to a barrel temperature of 280° C.,
performing kneading under a condition of a screw speed of 150 rpm to obtain particles,
providing the particles to a 100 ton injection molding machine, and
performing molding under conditions of a material cylinder temperature of 280° C. and a mold temperature of 90° C. to obtain the following test pieces:
i) a test piece 1 (length: 80.0 mm, width: 10.0 mm, thickness: 4 mm, provided with a V-shaped notch) provided with a Charpy notch for the impact strength evaluation,
ii) a test piece 2 (length: 100 mm, width: 50 mm, thickness: 2 mm) for the total light transmittance evaluation, and
iii) a test piece 3 (length: 127 mm, width: 12.7 mm, thickness: 1.6 mm) having a thickness of 1/16 inch for the flame retardance evaluation;
and the evaluation condition 2 comprises:
measuring the Charpy impact strength ($kJ/m^2$) of the test piece 1 according to JIS K 7111-1/1eA at a temperature of −30° C.,
measuring the total light transmittance (%) of the test piece 2 to a D65 light source using a hazemeter based on JIS K 7375, and
measuring, for the flame retardance, a total burn time of five test pieces 3 according to a vertical flame test method of a UL94V test.

2. The polyorganosiloxane-containing graft copolymer of claim 1, wherein the vinyl monomer mixture contains 2 to 95 mass % of the aromatic vinyl monomer ($b_2$).

3. The polyorganosiloxane-containing graft copolymer of claim 1, wherein the polyorganosiloxane-based rubber is a composite rubber containing the polyorganosiloxane and a polyalkyl(meth)acrylate (PA).

4. A thermoplastic resin composition, containing: a thermoplastic resin (A), the polyorganosiloxane-containing graft copolymer (G1) of claim 1, a fluorine resin (C), and a flame retardant (D).

5. The thermoplastic resin composition of claim 4, wherein the thermoplastic resin (A) is a thermoplastic resin having at least one bond selected from a carbonate bond, an ester bond, and an amide bond.

6. The thermoplastic resin composition of claim 4, wherein the thermoplastic resin (A) is a polycarbonate-based resin.

7. The thermoplastic resin composition of claim 4, wherein the flame retardant (D) contains at least one flame retardant selected from a phosphorus-based flame retardant and an organic metal salt-based flame retardant.

8. A molded article obtained by molding the thermoplastic resin composition of claim 4.

9. A molded article obtained by molding the thermoplastic resin composition of claim 7.

* * * * *